(12) United States Patent
Geoffrion et al.

(10) Patent No.: US 12,202,228 B2
(45) Date of Patent: Jan. 21, 2025

(54) FLASHING ASSEMBLIES AND RELATED SYSTEMS AND METHODS

(71) Applicant: Siplast Inc., Irving, TX (US)

(72) Inventors: Luke D. Geoffrion, Malvern, AR (US); Benjamin Alan Meyer, Moseley, VA (US)

(73) Assignee: Siplast Inc., Irving, TX (US)

( * ) Notice: Subject to any disclaimer, the term of this patent is extended or adjusted under 35 U.S.C. 154(b) by 0 days.

(21) Appl. No.: 18/432,897

(22) Filed: Feb. 5, 2024

(65) Prior Publication Data
US 2024/0262082 A1 Aug. 8, 2024

Related U.S. Application Data

(60) Provisional application No. 63/483,677, filed on Feb. 7, 2023.

(51) Int. Cl.
| | |
|---|---|
| *B32B 15/14* | (2006.01) |
| *B32B 5/02* | (2006.01) |
| *B32B 7/06* | (2019.01) |
| *B32B 7/12* | (2006.01) |
| *B32B 15/08* | (2006.01) |
| *B32B 15/18* | (2006.01) |
| *B32B 37/24* | (2006.01) |

(Continued)

(52) U.S. Cl.
CPC .............. *B32B 15/14* (2013.01); *B32B 5/022* (2013.01); *B32B 7/06* (2013.01); *B32B 7/12* (2013.01); *B32B 15/08* (2013.01); *B32B 15/18* (2013.01); *B32B 37/24* (2013.01); *B32B 38/08* (2013.01); *E04D 13/1415* (2013.01); *B32B 2255/26* (2013.01); *B32B 2260/021* (2013.01); *B32B 2260/046* (2013.01); *B32B 2307/7265* (2013.01); *B32B 2307/748* (2013.01); *B32B 2419/00* (2013.01); *E04D 2013/1422* (2013.01)

(58) Field of Classification Search
CPC ........... B32B 15/14; B32B 5/022; B32B 7/06; B32B 7/12; B32B 15/08; B32B 15/18; B32B 37/24; B32B 38/08; B32B 2419/00; E04D 13/1415; E04D 2013/1422
USPC ............... 52/58, 741.3, 741.4, 746.1, 746.11
See application file for complete search history.

(56) References Cited

U.S. PATENT DOCUMENTS

| | | |
|---|---|---|
| 3,497,417 A | 2/1970 | Rizzo |
| 3,654,765 A | 4/1972 | Healy et al. |
| 4,520,051 A | 5/1985 | Harrison |

(Continued)

FOREIGN PATENT DOCUMENTS

| | | |
|---|---|---|
| CA | 2532602 C | 11/2013 |
| CA | 3067607 A1 | 7/2020 |

(Continued)

OTHER PUBLICATIONS

Ever-Tread Technical Data Sheet.

*Primary Examiner* — Brian E Glessner
*Assistant Examiner* — Adam G Barlow
(74) *Attorney, Agent, or Firm* — GREENBERG TRAURIG, LLP

(57) ABSTRACT

A flashing assembly and related systems and methods are provided. The flashing assembly comprises a fleece layer, an attachment layer, and a flashing layer located between the fleece layer and the attachment layer. The fleece layer covers a portion of the flashing layer. The flashing assembly is configured to be installed on a building structure.

20 Claims, 22 Drawing Sheets

(51) Int. Cl.
*B32B 38/08* (2006.01)
*E04D 13/14* (2006.01)

(56) References Cited

U.S. PATENT DOCUMENTS

| | | | |
|---|---|---|---|
| 4,996,812 A * | 3/1991 | Venable | E04D 5/143 |
| | | | 52/408 |
| 5,356,980 A | 10/1994 | Feder et al. | |
| 5,733,947 A | 3/1998 | Loiselle et al. | |
| 5,763,014 A | 6/1998 | Pickett | |
| 5,899,026 A | 5/1999 | Williams et al. | |
| 5,979,131 A | 11/1999 | Remmele et al. | |
| 6,401,401 B1 | 6/2002 | Williams | |
| 6,437,071 B1 | 8/2002 | Odaka et al. | |
| 6,613,816 B2 | 9/2003 | Mahdi et al. | |
| 6,656,557 B2 * | 12/2003 | Phillips | B32B 11/04 |
| | | | 428/351 |
| 6,696,141 B2 | 2/2004 | Lolley et al. | |
| 6,868,643 B1 | 3/2005 | Williams | |
| 6,887,964 B2 | 5/2005 | Frisch et al. | |
| 6,945,000 B1 | 9/2005 | Hohmann et al. | |
| 6,964,136 B2 | 11/2005 | Collins et al. | |
| 7,317,051 B2 | 1/2008 | Georgeau et al. | |
| 7,410,703 B2 | 8/2008 | Giraud et al. | |
| 7,510,768 B2 | 3/2009 | Crawford et al. | |
| 7,605,203 B2 | 10/2009 | Feng et al. | |
| 7,662,221 B2 | 2/2010 | Fay | |
| 7,767,308 B2 | 8/2010 | Georgeau et al. | |
| 7,807,752 B2 | 10/2010 | Masutani et al. | |
| 8,022,149 B2 | 9/2011 | Ueda et al. | |
| 8,092,858 B2 | 1/2012 | Smith | |
| 8,142,856 B2 | 3/2012 | Chevalier | |
| 8,178,160 B2 | 5/2012 | Ferencz et al. | |
| 8,201,361 B2 | 6/2012 | Koch et al. | |
| 8,344,087 B2 | 1/2013 | Maton et al. | |
| 8,362,124 B2 | 1/2013 | Rajaraman et al. | |
| 8,372,515 B2 | 2/2013 | Byrne et al. | |
| 8,551,611 B2 | 10/2013 | Pichler | |
| 8,735,524 B2 | 5/2014 | Lai et al. | |
| 8,776,447 B2 | 7/2014 | Koch et al. | |
| 8,846,822 B2 | 9/2014 | Yano et al. | |
| 8,893,440 B2 | 11/2014 | Wetmore | |
| 8,937,141 B2 | 1/2015 | Sumi et al. | |
| 8,959,861 B1 * | 2/2015 | Wambaugh | E04F 13/0898 |
| | | | 52/409 |
| 8,966,845 B1 * | 3/2015 | Ciuperca | B32B 5/18 |
| | | | 52/309.12 |
| 8,974,627 B2 | 3/2015 | Schubert et al. | |
| 8,993,706 B2 | 3/2015 | Schubert et al. | |
| 9,102,799 B2 | 8/2015 | Bloomfield | |
| 9,156,981 B2 | 10/2015 | Lim et al. | |
| 9,169,393 B2 | 10/2015 | Rungta et al. | |
| 9,228,112 B2 | 1/2016 | Gorodisher et al. | |
| 9,243,152 B2 | 1/2016 | Iyer et al. | |
| 9,315,688 B2 | 4/2016 | Yanan et al. | |
| 9,328,259 B1 | 5/2016 | Andrews | |
| 9,334,433 B2 | 5/2016 | Oertli et al. | |
| 9,458,319 B2 | 10/2016 | Maliverney et al. | |
| 9,499,677 B2 | 11/2016 | Dukes et al. | |
| 9,523,022 B2 | 12/2016 | Johnson et al. | |
| 9,701,868 B2 | 7/2017 | Tezzi | |
| 9,745,489 B2 | 8/2017 | Swift et al. | |
| 9,797,130 B2 * | 10/2017 | Collins | E04B 1/7053 |
| 9,828,523 B2 | 11/2017 | Johnson et al. | |
| 9,850,165 B2 | 12/2017 | Dandekar et al. | |
| 9,882,082 B2 | 1/2018 | Kreutz et al. | |
| 9,896,601 B2 | 2/2018 | Setzke | |
| 9,914,842 B2 | 3/2018 | Bauer et al. | |
| 9,919,972 B2 | 3/2018 | Land et al. | |
| 9,987,120 B2 | 6/2018 | Soletti et al. | |
| 9,993,786 B2 | 6/2018 | Roland et al. | |
| 10,087,278 B2 | 10/2018 | Lobert et al. | |
| 10,100,068 B2 | 10/2018 | Burckhardt et al. | |
| 10,138,394 B2 | 11/2018 | Huda et al. | |
| 10,266,773 B2 | 4/2019 | Brooks et al. | |
| 10,269,477 B2 | 4/2019 | Matsutomi et al. | |
| 10,301,422 B2 | 5/2019 | Kramer et al. | |
| 10,308,552 B2 | 6/2019 | Dubey et al. | |
| 10,308,771 B2 | 6/2019 | Gao et al. | |
| 10,351,690 B2 | 7/2019 | Bardin et al. | |
| 10,370,563 B2 | 8/2019 | Tao et al. | |
| 10,392,480 B2 | 8/2019 | Cannas et al. | |
| 10,400,134 B2 | 9/2019 | Tatley et al. | |
| 10,414,875 B2 | 9/2019 | Cannas et al. | |
| 10,428,252 B2 | 10/2019 | Burckhardt et al. | |
| 10,550,286 B2 | 2/2020 | West | |
| 10,550,575 B2 | 2/2020 | Tang et al. | |
| 10,570,243 B2 | 2/2020 | Lim et al. | |
| 10,577,801 B2 | 3/2020 | Tselepis | |
| 10,661,503 B2 | 5/2020 | Monroe et al. | |
| 10,717,821 B2 | 7/2020 | Dei Santi et al. | |
| 10,745,523 B2 | 8/2020 | Scheim et al. | |
| 10,759,946 B2 | 9/2020 | Haberle et al. | |
| 10,800,885 B2 | 10/2020 | Fiedel et al. | |
| 10,829,585 B2 | 11/2020 | Becquet et al. | |
| 10,867,720 B2 | 12/2020 | Mallires et al. | |
| 10,889,682 B2 | 1/2021 | Damke et al. | |
| 10,898,606 B2 | 1/2021 | Stein et al. | |
| 10,899,926 B2 | 1/2021 | Kasemi et al. | |
| 10,920,078 B2 | 2/2021 | Grasmann et al. | |
| 10,988,933 B2 * | 4/2021 | Reynolds | B32B 27/12 |
| 10,995,074 B2 | 5/2021 | Cannas et al. | |
| 11,021,611 B2 | 6/2021 | Young | |
| 11,097,259 B2 | 8/2021 | Cannas et al. | |
| 11,104,762 B2 | 8/2021 | Hayes et al. | |
| 11,242,463 B2 | 2/2022 | Virtanen et al. | |
| 11,292,771 B2 | 4/2022 | Cannas et al. | |
| 11,383,886 B2 | 7/2022 | Cavallin et al. | |
| 11,434,372 B2 | 9/2022 | Verosky et al. | |
| 2001/0004490 A1 | 6/2001 | Wait | |
| 2001/0034984 A1 * | 11/2001 | Murphy | E06B 1/62 |
| | | | 52/204.5 |
| 2002/0152693 A1 | 10/2002 | Krogstad | |
| 2002/0170254 A1 * | 11/2002 | Ritland | E04D 5/12 |
| | | | 52/409 |
| 2003/0145546 A1 * | 8/2003 | Georgeau | E04D 5/12 |
| | | | 52/746.11 |
| 2004/0107662 A1 * | 6/2004 | Georgeau | E04D 5/14 |
| | | | 52/409 |
| 2004/0188016 A1 | 9/2004 | Mahdi et al. | |
| 2004/0244315 A1 * | 12/2004 | Rust | E04D 3/38 |
| | | | 52/198 |
| 2005/0028455 A1 * | 2/2005 | Koch | E04B 1/7046 |
| | | | 52/58 |
| 2005/0183387 A1 * | 8/2005 | Durning | B32B 13/04 |
| | | | 52/782.1 |
| 2007/0160766 A1 | 7/2007 | Copeland | |
| 2007/0187017 A1 * | 8/2007 | Hubbard | B32B 27/12 |
| | | | 156/60 |
| 2009/0137711 A1 | 5/2009 | Georgeau et al. | |
| 2009/0211189 A1 * | 8/2009 | Engberg | E04C 2/20 |
| | | | 52/309.3 |
| 2010/0247929 A1 | 9/2010 | Oertli et al. | |
| 2012/0017527 A1 | 1/2012 | Koch et al. | |
| 2012/0135244 A1 | 5/2012 | Yuki et al. | |
| 2013/0102738 A1 | 4/2013 | Stanjek et al. | |
| 2015/0218334 A1 | 8/2015 | Halbach et al. | |
| 2016/0069067 A1 * | 3/2016 | Ciuperca | E04B 1/7633 |
| | | | 52/309.8 |
| 2017/0145697 A1 * | 5/2017 | Anthony | E04D 13/064 |
| 2017/0204602 A1 * | 7/2017 | Collins | E04B 1/7046 |
| 2019/0330854 A1 * | 10/2019 | Reynolds | E04D 13/1407 |
| 2020/0181911 A1 | 6/2020 | Tselepis | |
| 2020/0270866 A1 | 8/2020 | Yancey et al. | |
| 2020/0339759 A1 | 10/2020 | Tepe et al. | |
| 2022/0267654 A1 | 8/2022 | Zheng et al. | |
| 2022/0307263 A1 | 9/2022 | Chich et al. | |

(56) References Cited

U.S. PATENT DOCUMENTS

2023/0295929 A1* 9/2023 Sandhar .................... B32B 5/18
                                                     52/506.01

FOREIGN PATENT DOCUMENTS

| CN | 104449439 A | 3/2015 |
|----|-------------|--------|
| CN | 113980609 A | 1/2022 |
| EP | 1650261 A1  | 4/2006 |
| EP | 1987108 B1  | 9/2009 |
| EP | 2119745 A1  | 11/2009 |
| EP | 2072577 B1  | 8/2010 |
| EP | 2046909 B1  | 10/2011 |
| WO | 2020176861 A1 | 9/2020 |
| WO | 2021158579 A1 | 8/2021 |
| WO | 2022051492 A1 | 3/2022 |
| WO | 2023114489 A1 | 6/2023 |

* cited by examiner

FLASHING ASSEMBLIES AND RELATED SYSTEMS AND METHODS

CROSS-REFERENCE TO RELATED APPLICATIONS

The present application claims priority to and benefit of U.S. Provisional Patent Application No. 63/483,677, filed Feb. 7, 2023 and entitled "FLASHING ASSEMBLIES AND RELATED SYSTEMS AND METHODS," the entirety of which is herein incorporated by reference.

FIELD

This disclosure generally relates to flashing assemblies and related systems and methods.

BACKGROUND

Building envelope systems are useful as protective barriers between an outdoor environment and an interior of a building structure. When installing a building envelope systems, portions of the underlying structure can be exposed to water.

SUMMARY

Some embodiments relate to a system. In some embodiments, the system comprises a building structure. In some embodiments, the system comprises a flashing assembly. In some embodiments, the flashing assembly is located on a first portion of the building structure. In some embodiments, the flashing assembly comprises a fleece layer. In some embodiments, the flashing assembly comprises a flashing layer. In some embodiments, the flashing assembly comprises an attachment layer. In some embodiments, the flashing layer is located between the fleece layer and the attachment layer. In some embodiments, the fleece layer covers a portion of the flashing layer. In some embodiments, the attachment layer attaches the flashing assembly to the first portion of the building structure. In some embodiments, the system comprises a first membrane. In some embodiments, the first membrane is located on a second portion of the building structure. In some embodiments, the system comprises a second membrane.

In some embodiments, the second membrane is located on the fleece layer of the flashing assembly. In some embodiments, the second membrane is located on the first membrane so as to form a water-resistant seal between the first membrane and the second membrane.

In some embodiments, the flashing assembly directly contacts the first portion of the building structure.

In some embodiments, the first membrane directly contacts the second portion of the building structure.

In some embodiments, the second membrane directly contacts the fleece layer of the flashing assembly.

In some embodiments, the second membrane directly contacts the first membrane.

In some embodiments, the second membrane comprises a liquid-applied membrane.

In some embodiments, the fleece layer of the flashing assembly is embedded in the liquid-applied membrane.

In some embodiments, the fleece layer directly contacts the flashing layer and wherein the flashing layer directly contacts the attachment layer.

Some embodiments relate to a flashing assembly. In some embodiments, the flashing assembly comprises a fleece layer. In some embodiments, the flashing assembly comprises a flashing layer. In some embodiments, the flashing assembly comprises an attachment layer. In some embodiments, the flashing layer is located between the fleece layer and the attachment layer. In some embodiments, the fleece layer covers a portion of the flashing layer. In some embodiments, the attachment layer is configured to attach the flashing assembly to a building structure.

In some embodiments, the fleece layer directly contacts the flashing layer.

In some embodiments, the flashing layer directly contacts the attachment layer.

In some embodiments, the fleece layer comprises a fleece sublayer. In some embodiments, the fleece layer comprises an adhesive sublayer. In some embodiments, the adhesive sublayer is located between the fleece sublayer and the flashing layer. In some embodiments, the adhesive sublayer adheres the fleece layer to the flashing layer.

In some embodiments, the fleece layer covers 10% to 90% of the flashing layer.

In some embodiments, the flashing layer is a stainless-steel flashing layer.

In some embodiments, the attachment layer comprises a first adhesive sublayer. In some embodiments, the attachment layer comprises a polymer sublayer. In some embodiments, the attachment layer comprises a second adhesive sublayer. In some embodiments, the polymer sublayer is located between the first adhesive sublayer and the second adhesive sublayer. In some embodiments, the first adhesive sublayer adheres the attachment layer to the flashing layer. In some embodiments, the second adhesive sublayer is configured to adhere the flashing assembly to a building structure.

In some embodiments, the polymer sublayer directly contacts the first adhesive sublayer.

In some embodiments, the polymer sublayer directly contacts the second adhesive sublayer.

In some embodiments, the flashing assembly further comprises a release liner. In some embodiments, the release liner covers the second adhesive sublayer of the attachment layer of the flashing assembly.

Some embodiments relate to a method of installation. In some embodiments, the method of installation comprises obtaining a first membrane. In some embodiments, the method of installation comprises obtaining a second membrane. In some embodiments, the method of installation comprises obtaining a flashing assembly. In some embodiments, the flashing assembly comprises a fleece layer. In some embodiments, the flashing assembly comprises a flashing layer. In some embodiments, the flashing assembly comprises an attachment layer. In some embodiments, the flashing layer is located between the fleece layer and the attachment layer. In some embodiments, the fleece layer covers a portion of the flashing layer. In some embodiments, the method of installation comprises applying the attachment layer of the flashing assembly to a first portion of a building structure, so as to attach the flashing assembly to the first portion of the building structure. In some embodiments, the method of installation comprises applying the first membrane to a second portion of the building structure, so as to secure the first membrane to the second portion of the building structure. In some embodiments, the method of installation comprises applying the second membrane to the fleece layer of the flashing assembly and to the first membrane, so as to form a water-resistant seal between the first membrane and the second membrane.

In some embodiments, the second membrane is a liquid-applied membrane formulation.

BRIEF DESCRIPTION OF THE DRAWINGS

Reference is made to the drawings that form a part of this disclosure, and which illustrate embodiments in which the materials and methods described herein can be practiced.

DETAILED DESCRIPTION

Some embodiments relate to a flashing assembly for providing continuity with other membranes of a building envelope system. In some embodiments, the flashing assembly is useful for providing a water-resistant seal between the flashing assembly and the other membranes of the building envelope system. In some embodiments, the flashing assembly is useful for providing an air and water barrier that, when installed on a building structure, protects the underlying structure on which the flashing assembly is installed, through to the interior of the building structure, from undesirable water infiltration. In some embodiments, the flashing assembly is useful for providing protection to a building structure during installation of a building envelope system. In some embodiments, the flashing assembly comprises a fleece layer, wherein the fleece layer is configured to be embedded into a liquid-applied membrane so as to provide a water-resistant seal therebetween.

Figure 1:
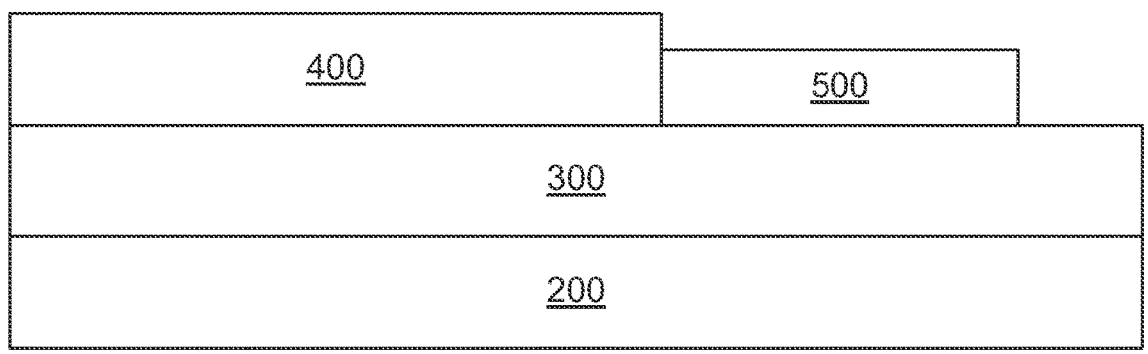
FIG. 1 is a cross-sectional view of a flashing assembly, according to some embodiments.

With reference to the figures, FIG. 1 is a cross-sectional view of a flashing assembly 10, according to some embodiments. In some embodiments, the flashing assembly 10 comprises one or more layers. For example, in some embodiments, the flashing assembly 10 comprises an attachment layer 200, a flashing layer 300, and a fleece layer 400, each of which may comprise one or more sublayers as described herein. As shown in FIG. 1, the flashing layer 300 is located between the attachment layer 200 and the fleece layer 400. In some embodiments, the attachment layer 200 covers a first surface of the flashing layer 300 and the fleece layer 400 covers a second surface of the flashing layer 300, wherein the second surface of the flashing layer 300 is opposite the first surface of the flashing layer 300. In some embodiments, the flashing assembly 10 further comprises a tape 500 located on the second surface of the flashing layer 300, wherein the tape 500 is removable and is located either adjacent or proximal to the fleece layer 400.

In some embodiments, the flashing assembly 10 comprises the attachment layer 200.

In some embodiments, the attachment layer 200 is a bottom layer of the flashing assembly 10. In some embodiments, for example, the attachment layer 200 is located between the flashing layer 300 and, when installed, a surface of a building structure. In some embodiments, the attachment layer 200 directly contacts the first surface of the flashing layer 300. In some embodiments, the attachment layer 200 is attached to the first surface of the flashing layer 300. In some embodiments, the attachment layer 200 is adhered to the first surface of the flashing layer 300 by an attachment sublayer, such as an adhesive sublayer. In some embodiments, the attachment layer 200 is bonded to the first surface of the flashing layer 300. In some embodiments, the attachment layer 200 is secured or fastened to the first surface of the flashing layer 300 by mechanical fastener(s). In some embodiments, at least one intervening layer is located between the attachment layer 200 and the flashing layer 300. In some embodiments, at least one intervening layer is located between the attachment layer 200 and, when installed, a surface of a building structure. In some embodiments, the attachment layer 200 is configured for attaching the flashing assembly to a first portion of a building structure.

In some embodiments, the attachment layer 200 comprises one or more attachment sublayers. In some embodiments, for example, the attachment layer 200 comprises at least one of a first attachment sublayer, a second attachment sublayer, a third attachment sublayer, a fourth attachment sublayer, a fifth attachment sublayer, a sixth attachment sublayer, a seventh attachment sublayer, an eighth attachment sublayer, a ninth attachment sublayer, a tenth attachment sublayer, or any combination thereof. In some embodiments, the attachment layer 200 comprises extruded sublayers. In some embodiments, the attachment layer 200 comprises co-extruded sublayers. In some embodiments, the attachment layer 200 comprises laminated sublayers. In some embodiments, the attachment layer 200 comprises bonded (e.g., thermally bonded) sublayers. In some embodiments, the attachment layer 200 comprises adhered sublayers. In some embodiments, the attachment layer 200 comprises fastened sublayers.

In some embodiments, the attachment layer 200 comprises at least one adhesive sublayer. In some embodiments, the at least one adhesive sublayer has a thickness of 1 mil to 20 mils. In some embodiments, the at least one adhesive sublayer has a thickness of 1 mil to 19 mils. In some embodiments, the at least one adhesive sublayer has a thickness of 1 mil to 18 mils. In some embodiments, the at least one adhesive sublayer has a thickness of 1 mil to 17 mils. In some embodiments, the at least one adhesive sublayer has a thickness of 1 mil to 16 mils. In some embodiments, the at least one adhesive sublayer has a thickness of 1 mil to 15 mils. In some embodiments, the at least one adhesive sublayer has a thickness of 1 mil to 14 mils. In some embodiments, the at least one adhesive sublayer has a thickness of 1 mil to 13 mils. In some embodiments, the at least one adhesive sublayer has a thickness of 1 mil to 12 mils. In some embodiments, the at least one adhesive sublayer has a thickness of 1 mil to 11 mils. In some embodiments, the at least one adhesive sublayer has a thickness of 1 mil to 10 mils. In some embodiments, the at least one adhesive sublayer has a thickness of 1 mil to 9 mils. In some embodiments, the at least one adhesive sublayer has a thickness of 1 mil to 8 mils. In some embodiments, the at least one adhesive sublayer has a thickness of 1 mil to 7 mils. In some embodiments, the at least one adhesive sublayer has a thickness of 1 mil to 6 mils. In some embodiments, the at least one adhesive sublayer has a thickness of 1 mil to 5 mils. In some embodiments, the at least one adhesive sublayer has a thickness of 1 mil to 4 mils. In some embodiments, the at least one adhesive sublayer has a thickness of 1 mil to 3 mils. In some embodiments, the at least one adhesive sublayer has a thickness of 1 mil to 2 mils.

In some embodiments, the at least one adhesive sublayer has a thickness of 2 mils to 20 mils. In some embodiments, the at least one adhesive sublayer has a thickness of 3 mils to 20 mils. In some embodiments, the at least one adhesive sublayer has a thickness of 4 mils to 20 mils. In some embodiments, the at least one adhesive sublayer has a thickness of 5 mils to 20 mils. In some embodiments, the at least one adhesive sublayer has a thickness of 6 mils to 20 mils. In some embodiments, the at least one adhesive sublayer has a thickness of 7 mils to 20 mils. In some embodiments, the at least one adhesive sublayer has a thickness of 8 mils to 20 mils. In some embodiments, the at least one adhesive sublayer has a thickness of 9 mils to 20 mils. In some embodiments, the at least one adhesive sublayer has a thickness of 10 mils to 20 mils. In some embodiments, the at least one adhesive sublayer has a thickness of 11 mils to 20 mils.

In some embodiments, the at least one adhesive sublayer has a thickness of 12 mils to 20 mils. In some embodiments, the at least one adhesive sublayer has a thickness of 13 mils to 20 mils. In some embodiments, the at least one adhesive sublayer has a thickness of 14 mils to 20 mils. In some embodiments, the at least one adhesive sublayer has a thickness of 15 mils to 20 mils. In some embodiments, the at least one adhesive sublayer has a thickness of 16 mils to 20 mils. In some embodiments, the at least one adhesive sublayer has a thickness of 17 mils to 20 mils. In some embodiments, the at least one adhesive sublayer has a thickness of 18 mils to 20 mils. In some embodiments, the at least one adhesive sublayer has a thickness of 19 mils to 20 mils.

In some embodiments, the attachment layer 200 comprises at least one polymer sublayer. In some embodiments, the at least one polymer sublayer has a thickness of 4 mils to 100 mils. In some embodiments, the at least one polymer sublayer has a thickness of 4 mils to 95 mils. In some embodiments, the at least one polymer sublayer has a thickness of 4 mils to 90 mils. In some embodiments, the at least one polymer sublayer has a thickness of 4 mils to 85 mils. In some embodiments, the at least one polymer sublayer has a thickness of 4 mils to 80 mils. In some embodiments, the at least one polymer sublayer has a thickness of 4 mils to 75 mils. In some embodiments, the at least one polymer sublayer has a thickness of 4 mils to 70 mils. In some embodiments, the at least one polymer sublayer has a thickness of 4 mils to 65 mils. In some embodiments, the at least one polymer sublayer has a thickness of 4 mils to 60 mils. In some embodiments, the at least one polymer sublayer has a thickness of 4 mils to 55 mils. In some embodiments, the at least one polymer sublayer has a thickness of 4 mils to 50 mils. In some embodiments, the at least one polymer sublayer has a thickness of 4 mils to 45 mils. In some embodiments, the at least one polymer sublayer has a thickness of 4 mils to 40 mils. In some embodiments, the at least one polymer sublayer has a thickness of 4 mils to 35 mils. In some embodiments, the at least one polymer sublayer has a thickness of 4 mils to 30 mils. In some embodiments, the at least one polymer sublayer has a thickness of 4 mils to 25 mils. In some embodiments, the at least one polymer sublayer has a thickness of 4 mils to 20 mils. In some embodiments, the at least one polymer sublayer has a thickness of 4 mils to 15 mils. In some embodiments, the at least one polymer sublayer has a thickness of 4 mils to 10 mils.

In some embodiments, the at least one polymer sublayer has a thickness of 5 mils to 100 mils. In some embodiments, the at least one polymer sublayer has a thickness of 10 mils to 100 mils. In some embodiments, the at least one polymer sublayer has a thickness of 15 mils to 100 mils. In some embodiments, the at least one polymer sublayer has a thickness of 20 mils to 100 mils. In some embodiments, the at least one polymer sublayer has a thickness of 25 mils to 100 mils. In some embodiments, the at least one polymer sublayer has a thickness of 30 mils to 100 mils. In some embodiments, the at least one polymer sublayer has a thickness of 35 mils to 100 mils. In some embodiments, the at least one polymer sublayer has a thickness of 40 mils to 100 mils. In some embodiments, the at least one polymer sublayer has a thickness of 45 mils to 100 mils. In some embodiments, the at least one polymer sublayer has a thickness of 50 mils to 100 mils. In some embodiments, the at least one polymer sublayer has a thickness of 55 mils to 100 mils. In some embodiments, the at least one polymer sublayer has a thickness of 60 mils to 100 mils. In some embodiments, the at least one polymer sublayer has a thickness of 65 mils to 100 mils. In some embodiments, the at least one polymer sublayer has a thickness of 70 mils to 100 mils. In some embodiments, the at least one polymer sublayer has a thickness of 75 mils to 100 mils. In some embodiments, the at least one polymer sublayer has a thickness of 80 mils to 100 mils. In some embodiments, the at least one polymer sublayer has a thickness of 85 mils to 100 mils. In some embodiments, the at least one polymer sublayer has a thickness of 90 mils to 100 mils. In some embodiments, the at least one polymer sublayer has a thickness of 95 mils to 100 mils.

In some embodiments, the attachment layer 200 has a thickness of 1 mil to 200 mils. In some embodiments, the attachment layer 200 has a thickness of 1 mil to 190 mils. In some embodiments, the attachment layer 200 has a thickness of 1 mil to 180 mils. In some embodiments, the attachment layer 200 has a thickness of 1 mil to 170 mils. In some embodiments, the attachment layer 200 has a thickness of 1 mil to 160 mils. In some embodiments, the attachment layer 200 has a thickness of 1 mil to 150 mils. In some embodiments, the attachment layer 200 has a thickness of 1 mil to 140 mils. In some embodiments, the attachment layer 200 has a thickness of 1 mil to 130 mils. In some embodiments, the attachment layer 200 has a thickness of 1 mil to 120 mils. In some embodiments, the attachment layer 200 has a thickness of 1 mil to 110 mils.

In some embodiments, the attachment layer 200 has a thickness of 1 mil to 100 mils. In some embodiments, the attachment layer 200 has a thickness of 1 mil to 90 mils. In some embodiments, the attachment layer 200 has a thickness of 1 mil to 80 mils. In some embodiments, the attachment layer 200 has a thickness of 1 mil to 70 mils. In some embodiments, the attachment layer 200 has a thickness of 1 mil to 60 mils. In some embodiments, the attachment layer 200 has a thickness of 1 mil to 50 mils. In some embodiments, the attachment layer 200 has a thickness of 1 mil to 40 mils. In some embodiments, the attachment layer 200 has a thickness of 1 mil to 30 mils. In some embodiments, the attachment layer 200 has a thickness of 1 mil to 20 mils. In some embodiments, the attachment layer 200 has a thickness of 1 mil to 10 mils.

In some embodiments, the attachment layer 200 has a thickness of 110 mils to 200 mils. In some embodiments, the attachment layer 200 has a thickness of 120 mils to 200 mils. In some embodiments, the attachment layer 200 has a thickness of 130 mils to 200 mils. In some embodiments, the attachment layer 200 has a thickness of 140 mils to 200 mils. In some embodiments, the attachment layer 200 has a thickness of 150 mils to 200 mils. In some embodiments, the attachment layer 200 has a thickness of 160 mils to 200 mils. In some embodiments, the attachment layer 200 has a thickness of 170 mils to 200 mils. In some embodiments, the attachment layer 200 has a thickness of 180 mils to 200 mils. In some embodiments, the attachment layer 200 has a thickness of 190 mils to 200 mils.

In some embodiments, the attachment layer 200 has a thickness of 10 mils to 200 mils. In some embodiments, the attachment layer 200 has a thickness of 20 mils to 200 mils. In some embodiments, the attachment layer 200 has a thickness of 30 mils to 200 mils. In some embodiments, the attachment layer 200 has a thickness of 40 mils to 200 mils. In some embodiments, the attachment layer 200 has a thickness of 50 mils to 200 mils. In some embodiments, the attachment layer 200 has a thickness of 60 mils to 200 mils. In some embodiments, the attachment layer 200 has a thickness of 70 mils to 200 mils. In some embodiments, the attachment layer 200 has a thickness of 80 mils to 200 mils. In some embodiments, the attachment layer 200 has a thickness of 90 mils to 200 mils. In some embodiments, the attachment layer 200 has a thickness of 100 mils to 200 mils.

In some embodiments, the attachment layer 200 has a thickness of 110 mils to 200 mils. In some embodiments, the attachment layer 200 has a thickness of 120 mils to 200 mils. In some embodiments, the attachment layer 200 has a thickness of 130 mils to 200 mils. In some embodiments, the attachment layer 200 has a thickness of 140 mils to 200 mils. In some embodiments, the attachment layer 200 has a thickness of 150 mils to 200 mils. In some embodiments, the attachment layer 200 has a thickness of 160 mils to 200 mils. In some embodiments, the attachment layer 200 has a thickness of 170 mils to 200 mils. In some embodiments, the attachment layer 200 has a thickness of 180 mils to 200 mils. In some embodiments, the attachment layer 200 has a thickness of 190 mils to 200 mils.

In some embodiments, the at least one adhesive sublayer of the attachment layer 200 comprises an adhesive. In some embodiments, the adhesive comprises at least one of a hot melt adhesive, a solvent-based adhesive, a pressure sensitive adhesive, a water-based adhesive, a UV cured or curable polymer, or any combination thereof. In some embodiments, the adhesive comprises at least one of an asphaltic adhesive, a butyl adhesive, a silicone adhesive, an acrylic adhesive, or any combination thereof. In some embodiments, the adhesive comprises at least one of thermosetting polyolefin, thermoplastic polyolefin (TPO), polyvinyl butyrate, silicone, polycarbonate, butyl rubber, styrene-butadiene-styrene (SBS), styrene-isoprene-styrene (SIS), styrene butadiene (SB), styrene-ethylene-butadiene-styrene (SEBS), ethylene vinyl acetate (EVA), a resin, a hydrocarbon resin, a rosin resin, a natural wax, a petroleum wax, an oil, bitumen, a solvent, vinyl acetate, an acrylic polymers, an acrylic copolymer, (e.g., at least one of vinyl acetate acrylic, ethylene vinyl acetate, styrene acrylic, vinyl chloride acrylic, vinyl versatate, or any combination thereof), or any combination thereof.

In some embodiments, the adhesive comprises at least one of a hot melt adhesive, a solvent-based adhesive, a pressure sensitive adhesive, a water-based adhesive, a UV cured or curable polymer, or any combination thereof. In some embodiments, the adhesive comprises at least one of an asphaltic adhesive, a butyl adhesive, a silicone adhesive, an epoxy adhesive, a polyurethane adhesive, an acrylic adhesive, or any combination thereof. In some embodiments, the adhesive comprises at least one of thermosetting polyolefin, thermoplastic polyolefin (TPO), polyvinyl butyrate, silicone, polycarbonate, butyl rubber, styrene, styrene-butadiene-styrene (SBS), styrene-isoprene-styrene (SIS), styrene butadiene (SB), styrene-ethylene-butadiene-styrene (SEBS), ethylene vinyl acetate (EVA), a resin, a hydrocarbon resin, a rosin resin, a natural wax, a petroleum wax, an oil, bitumen, a solvent, vinyl acetate, an acrylic polymer, an acrylic copolymer, (e.g., at least one of vinyl acetate acrylic, ethylene vinyl acetate, an ethylene acrylic, styrene acrylic, vinyl chloride acrylic, vinyl versatate, or any combination thereof), a silyl modified polymer, a silane terminated polymer, natural rubber, a polyolefin polymer, a poly-alpha-olefin (APAO/APO) polymer, a polyamide polyvinyl acetate, a polyvinyl alcohol, a polyamide, a polyester, a polyester amide, or any combination thereof.

In some embodiments, the at least one polymer sublayer of the attachment layer 200 comprises a polymer. In some embodiments, the at least one polymer sublayer of the attachment layer 200 is a polymer film. In some embodiments, the at least one polymer sublayer of the attachment layer 200 is a polymer sheet. In some embodiments, the polymer comprises a thermoplastic polymer. In some embodiments, the polymer comprises a thermoplastic polyolefin (TPO). In some embodiments, the polymer comprises at least one of polyethylene, polypropylene, any copolymer thereof, any homopolymer thereof, any polymer blend thereof, or any combination thereof. In some embodiments, the thermoplastic polyolefin comprises at least one of a copolymer of propylene and ethylene, a blend of propylene and ethylene, a copolymer of ethylene alpha-olefin, a propylene homopolymer, an ethylene homopolymer, a propylene block copolymer, an ethylene block copolymer, a propylene elastomer, an ethylene elastomer, or any combination thereof. In some embodiments, the thermoplastic polymer comprises at least one of a copolymer comprising ethylene and octene, a copolymer comprising ethylene and hexane, a copolymer comprising ethylene and butene, polyethylene (including raw and/or recycled low density polyethylene (LDPE)), linear low density polyethylene (LLDPE), high density polyethylene (HDPE)), polypropylenes (e.g., isotactic polypropylene (IPP) and/or atactic polypropylene (APP/IPP)), amorphous polyalpha olefins (APAO), amorphous polyolefins (APO), or any combination thereof. In some embodiments, the polymer comprises polyethylene terephthalate (PET). In some embodiments, the polymer comprises an acrylic polymer, such as, for example, polymethyl methacrylate. In some embodiments, the polymer comprises ethylene tetrafluoroethylene (ETFE).

Examples of the polymer include, for example and without limitation, at least one of Vistamaxx® 6102, Vistamaxx® 8880, both of which are polypropylenes (e.g., isotactic polypropylene (IPP)) that are available from ExxonMobil, Irving, Tex.; Elvaloy®, which is a terpolymer that is available from Dow/DuPont, Wilmington, Del.; Fusabond®, which is a chemically modified ethylene acrylate copolymer and/or a modified polyethylene, that is available from Dow/DuPont, Wilmington, Del.; RT2304, which is an amorphous polyalpha olefin (APAO) that is available from Rextac APAO Polymers LLC, Odessa, Tex.; Eastoflex® P1023, which is an amorphous polyolefin (APO) that comprises a propylene homopolymer, and is available from Eastman Chemical Company, Kingsport, Tenn.; Eastoflex® E1060, which is an amorphous polyolefin (APO) that comprises a copolymer of propylene and ethylene, and is available from Eastman Chemical Company, Kingsport, Tenn.; Eastoflex® M1025, which is an amorphous polyolefin (APO) that comprises a blend of propylene homopolymer and copolymers of propylene and ethylene, and is available from Eastman Chemical Company, Kingsport, Tenn.; Engage® 7487, which is a polyolefin elastomer (POE) that is available from Dow Inc., Midland, Mich., or any combination thereof.

In some embodiments, the attachment layer 200 comprises a removable liner. In some embodiments, the removable liner is adhered to the at least one adhesive sublayer of the attachment layer 200.

In some embodiments, the flashing assembly 10 comprises the flashing layer 300.

In some embodiments, the flashing layer 300 is a middle layer of the flashing assembly 10. In some embodiments, the flashing layer 300 is located between the attachment layer 200 and the fleece layer 400. In some embodiments, the flashing layer 300 has a first surface and a second surface opposite the first surface. In some embodiments, the attachment layer 200 directly contacts the first surface of the flashing layer 300. In some embodiments, the fleece layer 400 directly contacts the second surface of the flashing layer 300. In some embodiments, at least one intervening layer is located between the attachment layer 200 and the flashing layer 300. In some embodiments, at least one intervening layer is located between the flashing layer 300 and the fleece layer 400.

In some embodiments, the flashing layer 300 has a thickness of 1 mil to 20 mils. In some embodiments, the flashing layer 300 has a thickness of 1 mil to 19 mils. In some embodiments, the flashing layer 300 has a thickness of 1 mil to 18 mils. In some embodiments, the flashing layer 300 has a thickness of 1 mil to 17 mils. In some embodiments, the flashing layer 300 has a thickness of 1 mil to 16 mils. In some embodiments, the flashing layer 300 has a thickness of 1 mil to 15 mils. In some embodiments, the flashing layer 300 has a thickness of 1 mil to 14 mils. In some embodiments, the flashing layer 300 has a thickness of 1 mil to 13 mils. In some embodiments, the flashing layer 300 has a thickness of 1 mil to 12 mils. In some embodiments, the flashing layer 300 has a thickness of 1 mil to 11 mils. In some embodiments, the flashing layer 300 has a thickness of 1 mil to 10 mils. In some embodiments, the flashing layer 300 has a thickness of 1 mil to 9 mils. In some embodiments, the flashing layer 300 has a thickness of 1 mil to 8 mils. In some embodiments, the flashing layer 300 has a thickness of 1 mil to 7 mils. In some embodiments, the flashing layer 300 has a thickness of 1 mil to 6 mils. In some embodiments, the flashing layer 300 has a thickness of 1 mil to 5 mils. In some embodiments, the flashing layer 300 has a thickness of 1 mil to 4 mils. In some embodiments, the flashing layer 300 has a thickness of 1 mil to 3 mils. In some embodiments, the flashing layer 300 has a thickness of 1 mil to 2 mils.

In some embodiments, the flashing layer 300 has a thickness of 2 mils to 20 mils. In some embodiments, the flashing layer 300 has a thickness of 3 mils to 20 mils. In some embodiments, the flashing layer 300 has a thickness of 4 mils to 20 mils. In some embodiments, the flashing layer 300 has a thickness of 5 mils to 20 mils. In some embodiments, the flashing layer 300 has a thickness of 6 mils to 20 mils. In some embodiments, the flashing layer 300 has a thickness of 7 mils to 20 mils. In some embodiments, the flashing layer 300 has a thickness of 8 mils to 20 mils. In some embodiments, the flashing layer 300 has a thickness of 9 mils to 20 mils. In some embodiments, the flashing layer 300 has a thickness of 10 mils to 20 mils. In some embodiments, the flashing layer 300 has a thickness of 11 mils to 20 mils. In some embodiments, the flashing layer 300 has a thickness of 12 mils to 20 mils. In some embodiments, the flashing layer 300 has a thickness of 13 mils to 20 mils. In some embodiments, the flashing layer 300 has a thickness of 14 mils to 20 mils. In some embodiments, the flashing layer 300 has a thickness of 15 mils to 20 mils. In some embodiments, the flashing layer 300 has a thickness of 16 mils to 20 mils. In some embodiments, the flashing layer 300 has a thickness of 17 mils to 20 mils. In some embodiments, the flashing layer 300 has a thickness of 18 mils to 20 mils. In some embodiments, the flashing layer 300 has a thickness of 19 mils to 20 mils.

In some embodiments, the flashing layer 300 comprises a metal foil. In some embodiments, the flashing layer 300 comprises a metal sheet. In some embodiments, the flashing layer 300 comprises a base metal and a metal coating on the base metal. In some embodiments, the flashing layer 300 comprises one or more metals. In some embodiments, the flashing layer 300 comprises only one metal. In some embodiments, the flashing layer 300 comprises a plurality of metals. In some embodiments, the flashing layer 300 comprises a mixture of metals. In some embodiments, the flashing layer 300 comprises a metal alloy. In some embodiments, the flashing layer 300 is formed of at least one of aluminum, steel, stainless steel, copper, lead, galvanized steel, nickel, iron, Hastelloy, any alloy thereof, or any combination thereof. In some embodiments, the flashing layer 300 comprises stainless steel. For example, in some embodiments, the flashing layer 300 is a stainless-steel flashing layer. Non-limiting examples of stainless steel include, for example and without limitation, at least one of the following types: 304SS, 384SS, 316SS, 317SS, or any combination thereof, and the like.

In some embodiments, the flashing assembly 10 comprises a fleece layer 400.

In some embodiments, the fleece layer 400 is a top layer of the flashing assembly 10. In some embodiments, the fleece layer 400 is located between the flashing layer 300 and, when installed, a membrane. In some embodiments, the fleece layer 400 directly contacts the second surface of the flashing layer 300. In some embodiments, the fleece layer 400 is attached to the second surface of the flashing layer 300. In some embodiments, the fleece layer 400 is adhered to the second surface of the flashing layer 300 by an adhesive sublayer. In some embodiments, the fleece layer 400, for example, comprises a fleece sublayer and an adhesive sublayer, wherein the adhesive sublayer is located between the fleece sublayer and the flashing layer 300 and wherein the adhesive sublayer adheres the fleece layer 400 to the flashing layer 300. In some embodiments, the fleece layer 400 is bonded to the second surface of the flashing layer 300. In some embodiments, the fleece layer 400 is secured or fastened to the second surface of the flashing layer 300 by mechanical fastener(s). In some embodiments, at least one intervening layer is located between the fleece layer 400 and the flashing layer 300. In some embodiments, at least one intervening layer is located between the fleece layer 400 and, when installed, a membrane. In some embodiments, the fleece layer 400 covers a portion of the flashing layer 300.

In some embodiments, the fleece layer 400 comprises one or more fleece sublayers. In some embodiments, for example, the fleece layer 400 comprises at least one of a first fleece sublayer, a second fleece sublayer, a third fleece sublayer, a fourth fleece sublayer, a fifth fleece sublayer, a sixth fleece sublayer, a seventh fleece sublayer, an eighth fleece sublayer, a ninth fleece sublayer, a tenth fleece sublayer, or any combination thereof. In some embodiments, the fleece layer 400 comprises extruded sublayers. In some embodiments, the fleece layer 400 comprises co-extruded sublayers. In some embodiments, the fleece layer 400 comprises laminated sublayers. In some embodiments, the fleece layer 400 comprises bonded (e.g., thermally bonded) sublayers. In some embodiments, the fleece layer 400 comprises adhered sublayers. In some embodiments, the fleece layer 400 comprises fastened sublayers.

In some embodiments, the fleece layer comprises a fleece sublayer. In some embodiments, the fleece sublayer has a thickness of 2 mils to 200 mils. In some embodiments, the fleece sublayer has a thickness of 2 mils to 190 mils. In some embodiments, the fleece sublayer has a thickness of 2 mils to 180 mils. In some embodiments, the fleece sublayer has a thickness of 2 mils to 170 mils. In some embodiments, the fleece sublayer has a thickness of 2 mils to 160 mils. In some embodiments, the fleece sublayer has a thickness of 2 mils to 150 mils. In some embodiments, the fleece sublayer has a thickness of 2 mils to 140 mils. In some embodiments, the fleece sublayer has a thickness of 2 mils to 130 mils. In some embodiments, the fleece sublayer has a thickness of 2 mils to 120 mils. In some embodiments, the fleece sublayer has a thickness of 2 mils to 110 mils.

In some embodiments, the fleece sublayer has a thickness of 2 mils to 100 mils. In some embodiments, the fleece sublayer has a thickness of 2 mils to 90 mils. In some embodiments, the fleece sublayer has a thickness of 2 mils to 80 mils. In some embodiments, the fleece sublayer has a thickness of 2 mils to 70 mils. In some embodiments, the fleece sublayer has a thickness of 2 mils to 60 mils. In some embodiments, the fleece sublayer has a thickness of 2 mils to 50 mils. In some embodiments, the fleece sublayer has a thickness of 2 mils to 40 mils. In some embodiments, the fleece sublayer has a thickness of 2 mils to 30 mils. In some embodiments, the fleece sublayer has a thickness of 2 mils to 20 mils. In some embodiments, the fleece sublayer has a thickness of 2 mils to 10 mils.

In some embodiments, the fleece sublayer has a thickness of 10 mils to 200 mils. In some embodiments, the fleece sublayer has a thickness of 20 mils to 200 mils. In some embodiments, the fleece sublayer has a thickness of 30 mils to 200 mils. In some embodiments, the fleece sublayer has a thickness of 40 mils to 200 mils. In some embodiments, the fleece sublayer has a thickness of 50 mils to 200 mils. In some embodiments, the fleece sublayer has a thickness of 60 mils to 200 mils. In some embodiments, the fleece sublayer has a thickness of 70 mils to 200 mils. In some embodiments, the fleece sublayer has a thickness of 80 mils to 200 mils. In some embodiments, the fleece sublayer has a thickness of 90 mils to 200 mils.

In some embodiments, the fleece sublayer has a thickness of 100 mils to 200 mils. In some embodiments, the fleece sublayer has a thickness of 110 mils to 200 mils. In some embodiments, the fleece sublayer has a thickness of 120 mils to 200 mils. In some embodiments, the fleece sublayer has a thickness of 130 mils to 200 mils. In some embodiments, the fleece sublayer has a thickness of 140 mils to 200 mils. In some embodiments, the fleece sublayer has a thickness of 150 mils to 200 mils. In some embodiments, the fleece sublayer has a thickness of 160 mils to 200 mils. In some embodiments, the fleece sublayer has a thickness of 170 mils to 200 mils. In some embodiments, the fleece sublayer has a thickness of 180 mils to 200 mils. In some embodiments, the fleece sublayer has a thickness of 190 mils to 200 mils.

In some embodiments, the fleece layer 400 comprises at least one adhesive sublayer. In some embodiments, the at least one adhesive sublayer has a thickness of 1 mil to 20 mils. In some embodiments, the at least one adhesive sublayer has a thickness of 1 mil to 19 mils. In some embodiments, the at least one adhesive sublayer has a thickness of 1 mil to 18 mils. In some embodiments, the at least one adhesive sublayer has a thickness of 1 mil to 17 mils. In some embodiments, the at least one adhesive sublayer has a thickness of 1 mil to 16 mils. In some embodiments, the at least one adhesive sublayer has a thickness of 1 mil to 15 mils. In some embodiments, the at least one adhesive sublayer has a thickness of 1 mil to 14 mils. In some embodiments, the at least one adhesive sublayer has a thickness of 1 mil to 13 mils. In some embodiments, the at least one adhesive sublayer has a thickness of 1 mil to 12 mils. In some embodiments, the at least one adhesive sublayer has a thickness of 1 mil to 11 mils. In some embodiments, the at least one adhesive sublayer has a thickness of 1 mil to 10 mils. In some embodiments, the at least one adhesive sublayer has a thickness of 1 mil to 9 mils. In some embodiments, the at least one adhesive sublayer has a thickness of 1 mil to 8 mils. In some embodiments, the at least one adhesive sublayer has a thickness of 1 mil to 7 mils. In some embodiments, the at least one adhesive sublayer has a thickness of 1 mil to 6 mils. In some embodiments, the at least one adhesive sublayer has a thickness of 1 mil to 5 mils. In some embodiments, the at least one adhesive sublayer has a thickness of 1 mil to 4 mils. In some embodiments, the at least one adhesive sublayer has a thickness of 1 mil to 3 mils. In some embodiments, the at least one adhesive sublayer has a thickness of 1 mil to 2 mils.

In some embodiments, the at least one adhesive sublayer has a thickness of 2 mils to 20 mils. In some embodiments, the at least one adhesive sublayer has a thickness of 3 mils to 20 mils. In some embodiments, the at least one adhesive sublayer has a thickness of 4 mils to 20 mils. In some embodiments, the at least one adhesive sublayer has a thickness of 5 mils to 20 mils. In some embodiments, the at least one adhesive sublayer has a thickness of 6 mils to 20 mils. In some embodiments, the at least one adhesive sublayer has a thickness of 7 mils to 20 mils. In some embodiments, the at least one adhesive sublayer has a thickness of 8 mils to 20 mils. In some embodiments, the at least one adhesive sublayer has a thickness of 9 mils to 20 mils. In some embodiments, the at least one adhesive sublayer has a thickness of 10 mils to 20 mils. In some embodiments, the at least one adhesive sublayer has a thickness of 11 mils to 20 mils. In some embodiments, the at least one adhesive sublayer has a thickness of 12 mils to 20 mils. In some embodiments, the at least one adhesive sublayer has a thickness of 13 mils to 20 mils. In some embodiments, the at least one adhesive sublayer has a thickness of 14 mils to 20 mils. In some embodiments, the at least one adhesive sublayer has a thickness of 15 mils to 20 mils. In some embodiments, the at least one adhesive sublayer has a thickness of 16 mils to 20 mils. In some embodiments, the at least one adhesive sublayer has a thickness of 17 mils to 20 mils. In some embodiments, the at least one adhesive sublayer has a thickness of 18 mils to 20 mils. In some embodiments, the at least one adhesive sublayer has a thickness of 19 mils to 20 mils.

In some embodiments, the fleece layer 400 has a thickness of 3 mils to 300 mils. In some embodiments, the fleece layer 400 has a thickness of 3 mils to 290 mils. In some embodiments, the fleece layer 400 has a thickness of 3 mils to 280 mils. In some embodiments, the fleece layer 400 has a thickness of 3 mils to 270 mils. In some embodiments, the fleece layer 400 has a thickness of 3 mils to 260 mils. In some embodiments, the fleece layer 400 has a thickness of 3 mils to 250 mils. In some embodiments, the fleece layer 400 has a thickness of 3 mils to 240 mils. In some embodiments, the fleece layer 400 has a thickness of 3 mils to 230 mils. In some embodiments, the fleece layer 400 has a thickness of 3 mils to 220 mils. In some embodiments, the fleece layer 400 has a thickness of 3 mils to 210 mils.

In some embodiments, the fleece layer 400 has a thickness of 3 mils to 200 mils. In some embodiments, the fleece layer 400 has a thickness of 3 mils to 190 mils. In some embodiments, the fleece layer 400 has a thickness of 3 mils to 180 mils. In some embodiments, the fleece layer 400 has a thickness of 3 mils to 170 mils. In some embodiments, the fleece layer 400 has a thickness of 3 mils to 160 mils. In some embodiments, the fleece layer 400 has a thickness of 3 mils to 150 mils. In some embodiments, the fleece layer 400 has a thickness of 3 mils to 140 mils. In some embodiments, the fleece layer 400 has a thickness of 3 mils to 130 mils. In some embodiments, the fleece layer 400 has a thickness of 3 mils to 120 mils. In some embodiments, the fleece layer 400 has a thickness of 3 mils to 110 mils.

In some embodiments, the fleece layer 400 has a thickness of 3 mils to 100 mils. In some embodiments, the fleece layer 400 has a thickness of 3 mils to 90 mils. In some embodiments, the fleece layer 400 has a thickness of 3 mils to 80 mils. In some embodiments, the fleece layer 400 has a thickness of 3 mils to 70 mils. In some embodiments, the fleece layer 400 has a thickness of 3 mils to 60 mils. In some embodiments, the fleece layer 400 has a thickness of 3 mils to 50 mils. In some embodiments, the fleece layer 400 has a thickness of 3 mils to 40 mils. In some embodiments, the fleece layer 400 has a thickness of 3 mils to 30 mils. In some embodiments, the fleece layer 400 has a thickness of 3 mils to 20 mils. In some embodiments, the fleece layer 400 has a thickness of 3 mils to 10 mils.

In some embodiments, the fleece layer 400 has a thickness of 10 mils to 300 mils. In some embodiments, the fleece layer 400 has a thickness of 20 mils to 300 mils. In some embodiments, the fleece layer 400 has a thickness of 30 mils to 300 mils. In some embodiments, the fleece layer 400 has a thickness of 40 mils to 300 mils. In some embodiments, the fleece layer 400 has a thickness of 50 mils to 300 mils. In some embodiments, the fleece layer 400 has a thickness of 60 mils to 300 mils. In some embodiments, the fleece layer 400 has a thickness of 70 mils to 300 mils. In some embodiments, the fleece layer 400 has a thickness of 80 mils to 300 mils. In some embodiments, the fleece layer 400 has a thickness of 90 mils to 300 mils. In some embodiments, the fleece layer 400 has a thickness of 100 mils to 300 mils.

In some embodiments, the fleece layer 400 has a thickness of 110 mils to 300 mils. In some embodiments, the fleece layer 400 has a thickness of 120 mils to 300 mils. In some embodiments, the fleece layer 400 has a thickness of 130 mils to 300 mils. In some embodiments, the fleece layer 400 has a thickness of 140 mils to 300 mils. In some embodiments, the fleece layer 400 has a thickness of 150 mils to 300 mils. In some embodiments, the fleece layer 400 has a thickness of 160 mils to 300 mils. In some embodiments, the fleece layer 400 has a thickness of 170 mils to 300 mils. In some embodiments, the fleece layer 400 has a thickness of 180 mils to 300 mils. In some embodiments, the fleece layer 400 has a thickness of 190 mils to 300 mils. In some embodiments, the fleece layer 400 has a thickness of 200 mils to 300 mils.

In some embodiments, the fleece layer 400 has a thickness of 210 mils to 300 mils. In some embodiments, the fleece layer 400 has a thickness of 220 mils to 300 mils. In some embodiments, the fleece layer 400 has a thickness of 230 mils to 300 mils. In some embodiments, the fleece layer 400 has a thickness of 240 mils to 300 mils. In some embodiments, the fleece layer 400 has a thickness of 250 mils to 300 mils. In some embodiments, the fleece layer 400 has a thickness of 260 mils to 300 mils. In some embodiments, the fleece layer 400 has a thickness of 270 mils to 300 mils. In some embodiments, the fleece layer 400 has a thickness of 280 mils to 300 mils. In some embodiments, the fleece layer 400 has a thickness of 290 mils to 300 mils.

In some embodiments, the fleece layer 400 covers a portion of the flashing layer 300. As used herein, the term "covers" refers to a percentage of a surface area of a surface which is covered. In some embodiments, the fleece layer 400 covers a portion of a surface of the flashing layer 300. In some embodiments, the fleece layer 400 covers 10% to 90% of the surface of the flashing layer 300. In some embodiments, the fleece layer 400 covers 10% to 80% of the surface of the flashing layer 300. In some embodiments, the fleece layer 400 covers 10% to 70% of the surface of the flashing layer 300. In some embodiments, the fleece layer 400 covers 10% to 60% of the surface of the flashing layer 300. In some embodiments, the fleece layer 400 covers 10% to 50% of the surface of the flashing layer 300. In some embodiments, the fleece layer 400 covers 10% to 40% of the surface of the flashing layer 300. In some embodiments, the fleece layer 400 covers 10% to 30% of the surface of the flashing layer 300. In some embodiments, the fleece layer 400 covers 10% to 20% of the surface of the flashing layer 300.

In some embodiments, the fleece layer 400 covers 20% to 90% of the surface of the flashing layer 300. In some embodiments, the fleece layer 400 covers 30% to 90% of the surface of the flashing layer 300. In some embodiments, the fleece layer 400 covers 40% to 90% of the surface of the flashing layer 300. In some embodiments, the fleece layer 400 covers 50% to 90% of the surface of the flashing layer 300. In some embodiments, the fleece layer 400 covers 60% to 90% of the surface of the flashing layer 300. In some embodiments, the fleece layer 400 covers 70% to 90% of the surface of the flashing layer 300. In some embodiments, the fleece layer 400 covers 80% to 90% of the surface of the flashing layer 300.

In some embodiments, the fleece layer 400 covers 20% to 80% of the surface of the flashing layer 300. In some embodiments, the fleece layer 400 covers 25% to 75% of the surface of the flashing layer 300. In some embodiments, the fleece layer 400 covers 30% to 60% of the surface of the flashing layer 300. In some embodiments, the fleece layer 400 covers 35% to 55% of the surface of the flashing layer 300. In some embodiments, the fleece layer 400 covers 40% to 50% of the surface of the flashing layer 300. In some embodiments, the fleece layer 400 covers an entire surface of the flashing layer 300. In some embodiments, the fleece layer 400 does not cover an entire surface of the flashing layer 300.

In some embodiments, the fleece sublayer of the fleece layer 400 comprises a fabric. In some embodiments, the fleece sublayer comprises a woven fabric. In some embodiments, the fleece sublayer comprises a non-woven fabric. In some embodiments, the fleece sublayer is formed of a polymeric material. In some embodiments, for example, the fleece sublayer is formed of a polyester. In some embodiments, the fleece sublayer is formed of a polyolefin. In some embodiments, the fleece sublayer comprises a scrim. In some embodiments, the fleece sublayer comprises a fibrous polymeric material. In some embodiments, the fleece layer comprises a polyethylene terephthalate. In some embodiments, the fleece layer comprises a glass fiber mat. In some embodiments, the fleece layer comprises a glass-reinforced polyester. In some embodiments, the fleece sublayer comprises a glass-reinforced polyolefin fabric.

In some embodiments, the at least one adhesive sublayer of the fleece layer 400 comprises an adhesive. In some embodiments, the adhesive comprises at least one of a hot melt adhesive, a solvent-based adhesive, a pressure sensitive adhesive, a water-based adhesive, a UV cured or curable polymer, or any combination thereof. In some embodiments, the adhesive comprises at least one of an asphaltic adhesive, a butyl adhesive, a silicone adhesive, an acrylic adhesive, or any combination thereof. In some embodiments, the adhesive comprises at least one of thermosetting polyolefin, thermoplastic polyolefin (TPO), polyvinyl butyrate, silicone, polycarbonate, butyl rubber, styrene-butadiene-styrene (SBS), styrene-isoprene-styrene (SIS), styrene butadiene (SB), styrene-ethylene-butadiene-styrene (SEBS), ethylene vinyl acetate (EVA), a resin, a hydrocarbon resin, a rosin resin, a natural wax, a petroleum wax, an oil, bitumen, a solvent, vinyl acetate, an acrylic polymers, an acrylic copolymer, (e.g., at least one of vinyl acetate acrylic, ethylene vinyl acetate, styrene acrylic, vinyl chloride acrylic, vinyl versatate, or any combination thereof), or any combination thereof.

In some embodiments, the adhesive comprises at least one of a hot melt adhesive, a solvent-based adhesive, a pressure sensitive adhesive, a water-based adhesive, a UV cured or curable polymer, or any combination thereof. In some embodiments, the adhesive comprises at least one of an asphaltic adhesive, a butyl adhesive, a silicone adhesive, an epoxy adhesive, a polyurethane adhesive, an acrylic adhesive, or any combination thereof. In some embodiments, the adhesive comprises at least one of thermosetting polyolefin, thermoplastic polyolefin (TPO), polyvinyl butyrate, silicone, polycarbonate, butyl rubber, styrene, styrene-butadiene-styrene (SBS), styrene-isoprene-styrene (SIS), styrene butadiene (SB), styrene-ethylene-butadiene-styrene (SEBS), ethylene vinyl acetate (EVA), a resin, a hydrocarbon resin, a rosin resin, a natural wax, a petroleum wax, an oil, bitumen, a solvent, vinyl acetate, an acrylic polymer, an acrylic copolymer, (e.g., at least one of vinyl acetate acrylic, ethylene vinyl acetate, an ethylene acrylic, styrene acrylic, vinyl chloride acryalic, vinyl versatate, or any combination thereof), a silyl modified polymer, a silane terminated polymer, natural rubber, a polyolefin polymer, a poly-alpha-olefin (APAO/APO) polymer, a polyamide polyvinyl acetate, a polyvinyl alcohol, a polyamide, a polyester, a polyester amide, or any combination thereof.

Figure 2:
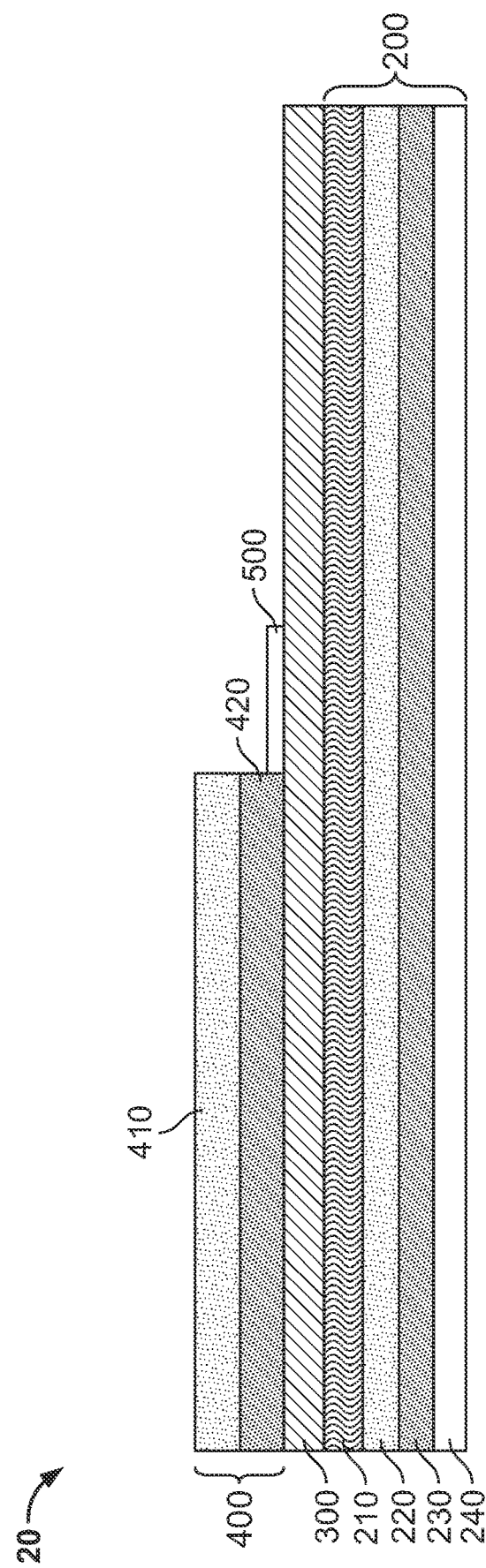
FIG. 2 is a cross-sectional view of a flashing assembly, according to some embodiments.

FIG. 2 is a cross-sectional view of a flashing assembly 20, according to some embodiments. The flashing assembly 20 is an embodiment of the flashing assembly 10 depicted in FIG. 1. As shown in FIG. 2, in some embodiments, the flashing assembly 20 comprises an attachment layer 200, a fleece layer 400, and a flashing layer 300 located between the attachment layer 200 and the fleece layer 400. In some embodiments, the attachment layer 200 comprises an adhesive sublayer 210, an adhesive sublayer 230, and a polymer sublayer 220 located between the adhesive sublayer 210 and the adhesive sublayer 230. In some embodiments, the fleece layer 400 comprises a fleece sublayer 410, and an adhesive sublayer 420 located between the fleece sublayer 410 and the flashing layer 300. In the illustrated embodiment, the adhesive sublayer 210 adheres the attachment layer 200 to the flashing layer 300, the adhesive sublayer 230 adheres the attachment layer 200 to a release liner 240, and the adhesive sublayer 420 adheres the fleece layer 400 to the flashing layer 300. In some embodiments, a tape 500 is located on the flashing layer 300, either adjacent or proximate to the fleece layer 400.

In some embodiments, the flashing assembly 10, 20 can be installed on, between, near, or over various building structures. As used herein, the term "building structure" refers to any structural component of a building. For example, in some embodiments, a building structure comprises at least one of a parapet wall, a roof substrate, a roof deck, a skylight, a roof edge, a building wall, a roof penetration, rough openings such as a window frame and/or a door frame, a seam between walls and other structures, a pipe, a corner, an edge, an overhang, a coating, a framing, a through-hole in a wall, or any combination thereof. In some embodiments, a roof deck is a structure supporting a roof.

In some embodiments, a roof substrate comprises at least one of a plywood substrate, a glass substrate, a cellulosic substrate, a roof shingle, a mat, a fabric, a glass mat, a fiberglass mat, an underlayment, a roofing membrane, a roof deck, a photovoltaic (PV) panel, a modified bitumen (MODBIT) substrate, a roll good, a board (such as but not limited to at least one of a foam board (e.g., a polyisocyanurate (ISO) foam board), a cover board, or any combination thereof), a pipe, a base sheet, a chimney, a wax paper, or any combination thereof. In some embodiments, a parapet wall is a barrier at an edge of a structure, such as, for example and without limitation, at least one of a roof, a terrace, a balcony, a walkway, or any combination thereof, and the like. In some embodiments, the flashing assembly 10, 20 is a flashing membrane.

Referring now to FIGS. 3-6, various embodiments of the flashing assembly 10 installed on a building structure are shown. In these embodiments, the flashing assembly 10 is same or similar to the flashing assembly 10 and/or the flashing assembly 20 discussed above with reference to FIG. 1 and FIG. 2, respectively, so the same or similar reference numerals are used where appropriate. In addition, the building structure in these embodiments comprises a parapet wall 600 extending upwards from a roof deck 700. As shown, in some embodiments, the parapet wall 600 has a first side, a second side opposite the first side, and a top surface extending between the first side and the second side, wherein the first side of the parapet wall 600 is the side of the parapet wall 600 that faces towards the roof deck, and wherein the second side of the parapet wall 600 is the side of the parapet wall 600 that faces away from the roof deck.

Figure 3A:
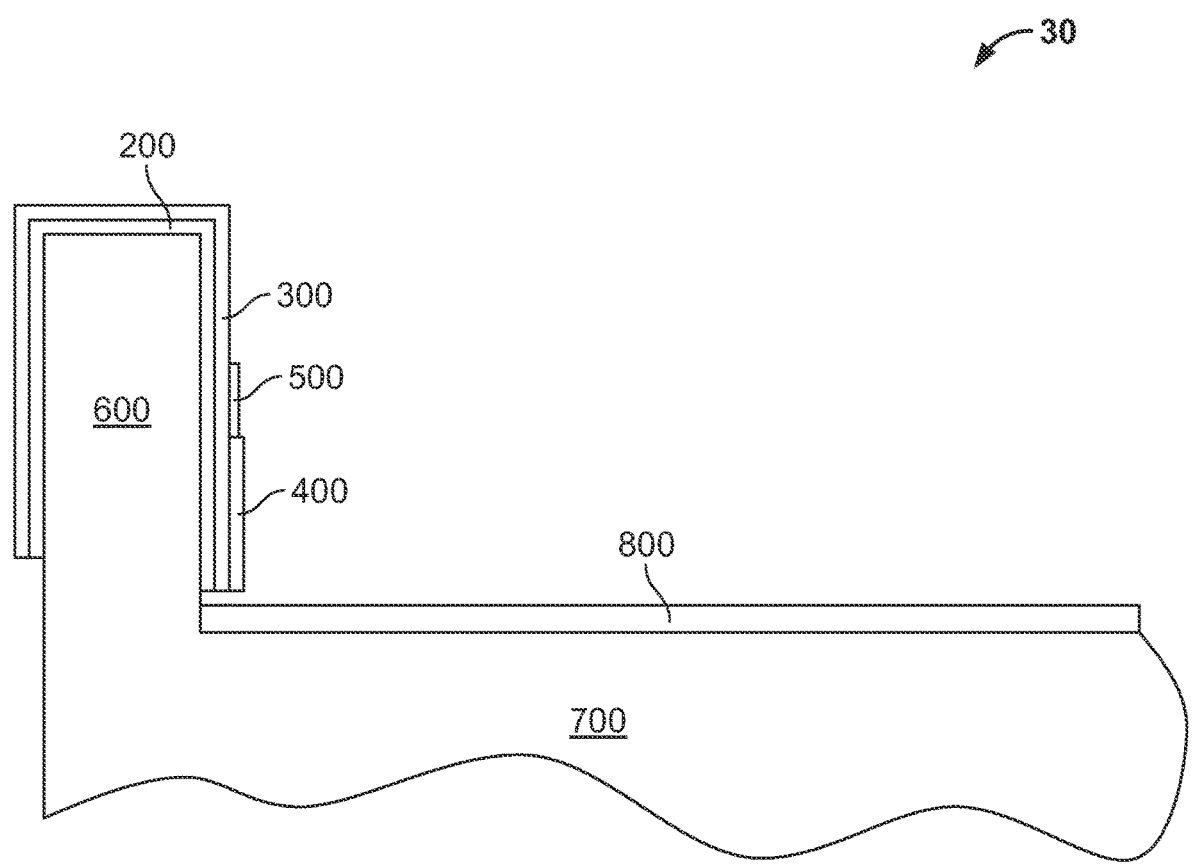
FIGS. 3A-3C are cross-sectional views of a flashing assembly at various stages of being installed on a parapet wall, according to some embodiments.
Figure 3B:
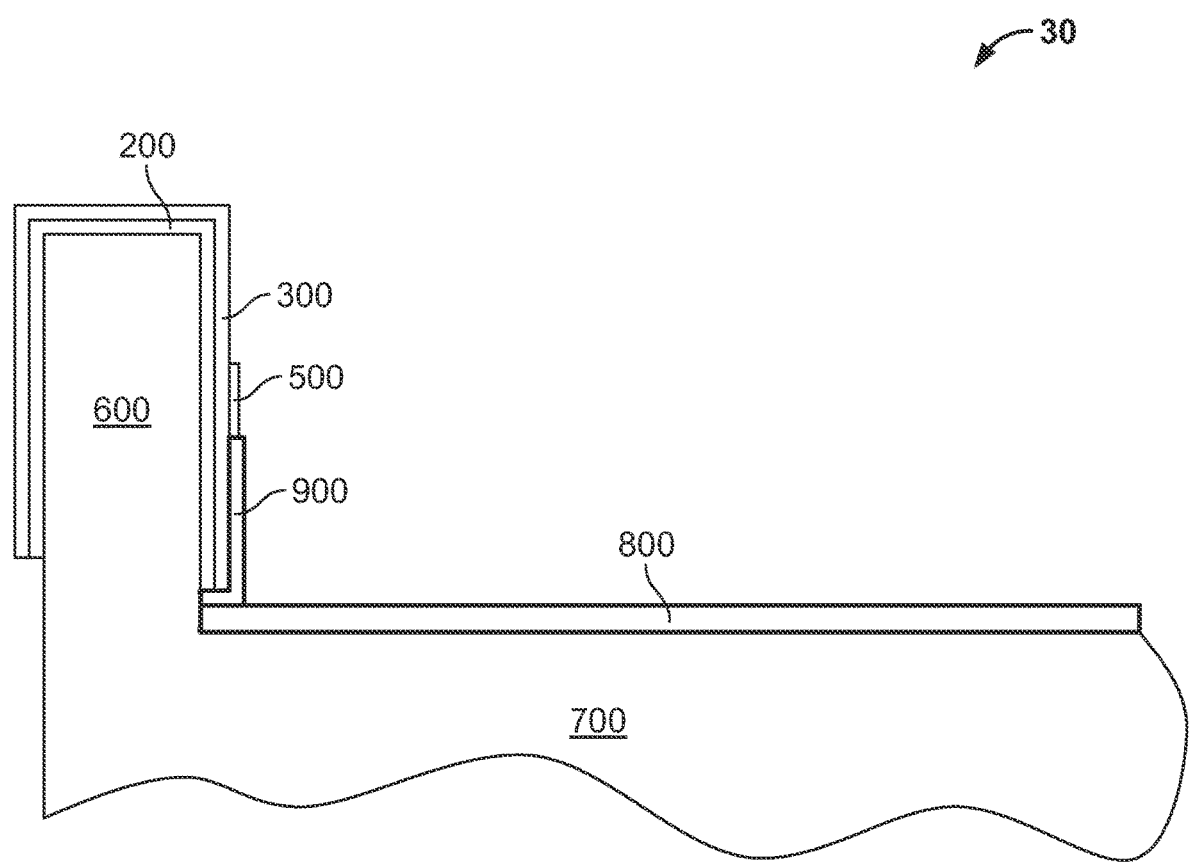
Figure 3C:
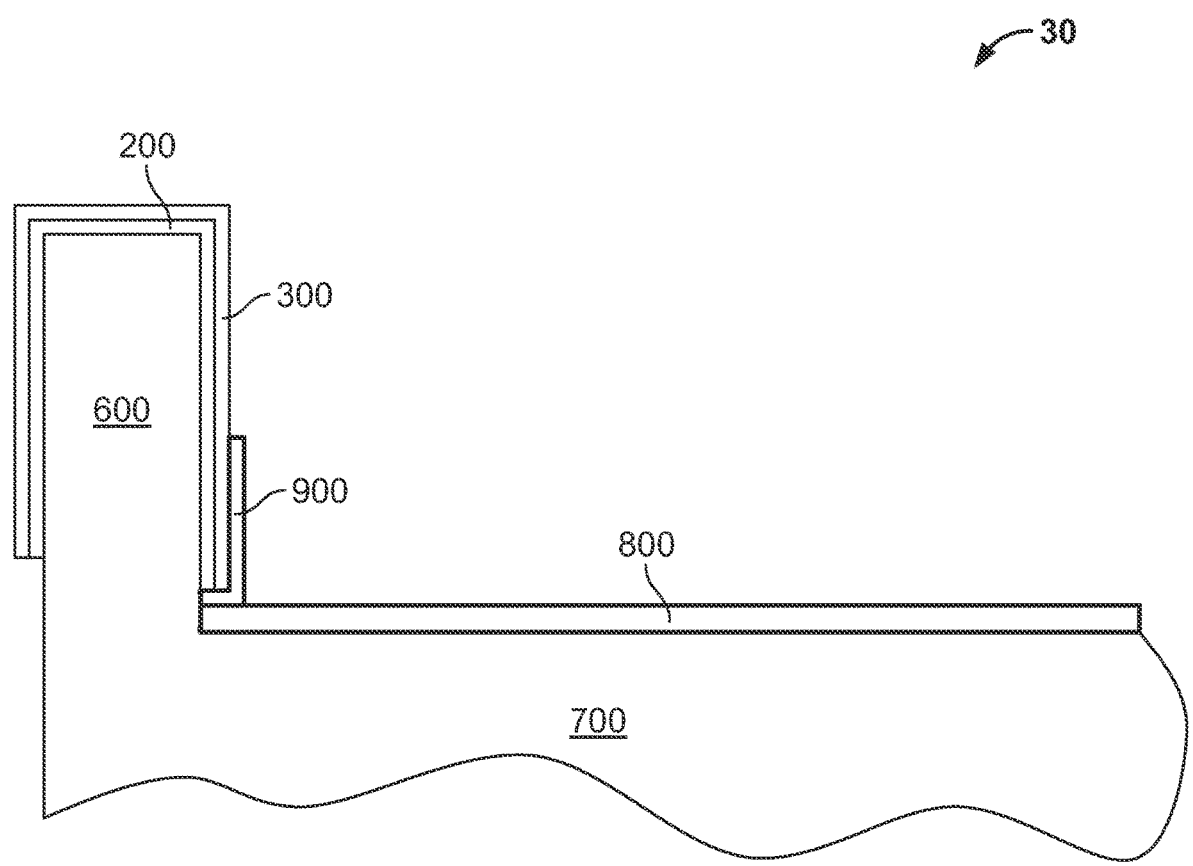

With reference to FIGS. 3A-3C, the flashing system 30 is shown at various stages of an installation process, according to some embodiments. In FIG. 3A, a first flashing assembly 10 is shown installed on the parapet wall 600 with a first fleece layer 400 facing towards the roof deck 700, and a first membrane 800 is shown installed on the roof deck 700. In FIG. 3B, a second membrane 900 is shown installed on the first flashing assembly 10 so as to form a water-resistant seal between the first flashing assembly 10 and the first membrane 800. In FIG. 3C, the flashing system 20 is shown fully installed on the building structure, with the tape 500 removed from the first flashing assembly 10. In some embodiments, the water-resistance of the resulting water-resistant seal is measured (pass/fail) according to ASTM D1970.

In some embodiments, the first attachment layer 200 of the first flashing assembly 10 directly contacts the parapet wall 600. In some embodiments, the first attachment layer 200 of the first flashing assembly 10 attaches the first flashing assembly 10 to the parapet wall 600. In some embodiments, the first attachment layer 200 of the first flashing assembly 10 adheres the first flashing assembly 10 to the parapet wall 600. In some embodiments, the first attachment layer 200 of the first flashing assembly 10 bonds the first flashing assembly 10 to the parapet wall 600. In some embodiments, the first attachment layer 200 of the first flashing assembly 10 secures or fastens the first flashing assembly 10 to the parapet wall 600. In some embodiments, the first attachment layer 200 of the first flashing assembly 10 covers the parapet wall 600. In some embodiments, the first attachment layer 200 of the first flashing assembly 10 covers the first side of the parapet wall 600. In some embodiments, the first attachment layer 200 of the first flashing assembly 10 covers the second side of the parapet wall 600. In some embodiments, the first attachment layer 200 of the first flashing assembly 10 covers the top surface of the parapet wall 600. In some embodiments, an intervening layer is located between the first attachment layer 200 of the first flashing assembly 10 and the parapet wall 600.

In some embodiments, the first attachment layer 200 of the first flashing assembly 10 directly contacts at least a portion of the parapet wall 600. In some embodiments, the first attachment layer 200 of the first flashing assembly 10 contacts the first side of the parapet wall 600. In some embodiments, the first attachment layer 200 of the first flashing assembly 10 contacts the top surface of the parapet wall 600. In some embodiments, the first attachment layer 200 of the first flashing assembly 10 contacts the second side of the parapet wall 600. In some embodiments, the first attachment layer 200 of the first flashing assembly 10 does not contact at least one of the first side, the second side, or the top surface of the parapet wall 600. In some embodiments, an intervening layer is positioned between the first attachment layer 200 of the first flashing assembly 10 and the parapet wall 600.

In some embodiments, the first fleece layer 400 of the first flashing assembly 10 covers the parapet wall 600. In some embodiments, the first fleece layer 400 of the first flashing assembly 10 covers the first side of the parapet wall 600. In some embodiments, the first fleece layer 400 of the first flashing assembly 10 covers the top surface of the parapet wall 600. In some embodiments, the first fleece layer 400 of the first flashing assembly 10 covers the first side of the parapet wall 600 and the top surface of the parapet wall. In some embodiments, the first fleece layer 400 of the first flashing assembly 10 covers the roof deck 700. In some embodiments, the first fleece layer 400 of the first flashing assembly 10 does not cover the second side of the parapet wall 600. In some embodiments, the first fleece layer 400 of the first flashing assembly 10 does not cover the top surface of the parapet wall 600.

In some embodiments, the first membrane 800 directly contacts the roof deck 700. In some embodiments, the first membrane 800 is attached to the roof deck 700. In some embodiments, the first membrane 800 is adhered to the roof deck 700. In some embodiments, the first membrane 800 is bonded to the roof deck 700. In some embodiments, the first membrane 800 is welded to the roof deck 700. In some embodiments, the first membrane 800 is secured or fastened to the roof deck 700. In some embodiments, an intervening layer is located between the first membrane 800 and the roof deck 700. In some embodiments, the first membrane 800 comprises a polymer.

In some embodiments, the first membrane 800 is a single ply membrane. In some embodiments, the first membrane 800 is a TPO membrane. In some embodiments, the first membrane 800 is an EPDM membrane. In some embodiments, the first membrane 800 is a PVC membrane. In some embodiments, the first membrane 800 is a liquid applied membrane. In some embodiments, the liquid-applied membrane is a fluid-applied coating that provides waterproofing. In some embodiments, the liquid-applied membrane comprises a polymer. In some embodiments, for example, the liquid-applied membrane comprises at least one of a silicone, an acrylic polymer, a polyurethane, a silyl-terminated polymer (e.g., silyl-terminated polyether), or any combination thereof. In some embodiments, the first membrane 800 comprises a scrim or a mat embedded in a coating.

In some embodiments, the second membrane 900 is located on the first fleece layer 400 of the first flashing assembly 10. In some embodiments, the second membrane 900 covers all or at least a portion of the first fleece layer 400 of the first flashing assembly 10. In some embodiments, the second membrane 900 directly contacts the first fleece layer 400 of the first flashing assembly 10. In some embodiments, the second membrane 900 contacts the first membrane 800 so as to form a water-resistant seal between the first membrane 800 and the first flashing assembly 10. In some embodiments, the second membrane 900 is a liquid applied membrane, wherein the liquid applied membrane is embedded into the first fleece layer 400 of the first flashing assembly, so as to obtain an in situ composite membrane. In some embodiments, when a material is embedded into another material, the resulting materials are chemically bonded. In some embodiments, the second membrane 900 is not a liquid applied membrane. For example, in some embodiments, the second membrane 900 is a single ply membrane. In some embodiments, the second membrane 900 is a TPO membrane. In some embodiments, the second membrane 900 is an EPDM membrane. In some embodiments, the second membrane 900 is a PVC membrane.

In some embodiments, the first membrane 800 has a thickness of 1 mil to 200 mils. In some embodiments, the first membrane 800 has a thickness of 1 mil to 190 mils. In some embodiments, the first membrane 800 has a thickness of 1 mil to 180 mils. In some embodiments, the first membrane 800 has a thickness of 1 mil to 170 mils. In some embodiments, the first membrane 800 has a thickness of 1 mil to 160 mils. In some embodiments, the first membrane 800 has a thickness of 1 mil to 150 mils. In some embodiments, the first membrane 800 has a thickness of 1 mil to 140 mils. In some embodiments, the first membrane 800 has a thickness of 1 mil to 130 mils. In some embodiments, the first membrane 800 has a thickness of 1 mil to 120 mils. In some embodiments, the first membrane 800 has a thickness of 1 mil to 110 mils.

In some embodiments, the first membrane 800 has a thickness of 1 mil to 100 mils. In some embodiments, the first membrane 800 has a thickness of 1 mil to 90 mils. In some embodiments, the first membrane 800 has a thickness of 1 mil to 80 mils. In some embodiments, the first membrane 800 has a thickness of 1 mil to 70 mils. In some embodiments, the first membrane 800 has a thickness of 1 mil to 60 mils. In some embodiments, the first membrane 800 has a thickness of 1 mil to 50 mils. In some embodiments, the first membrane 800 has a thickness of 1 mil to 40 mils. In some embodiments, the first membrane 800 has a thickness of 1 mil to 30 mils. In some embodiments, the first membrane 800 has a thickness of 1 mil to 20 mils. In some embodiments, the first membrane 800 has a thickness of 1 mil to 10 mils.

In some embodiments, the first membrane 800 has a thickness of 110 mils to 200 mils. In some embodiments, the first membrane 800 has a thickness of 120 mils to 200 mils. In some embodiments, the first membrane 800 has a thickness of 130 mils to 200 mils. In some embodiments, the first membrane 800 has a thickness of 140 mils to 200 mils. In some embodiments, the first membrane 800 has a thickness of 150 mils to 200 mils. In some embodiments, the first membrane 800 has a thickness of 160 mils to 200 mils. In some embodiments, the first membrane 800 has a thickness of 170 mils to 200 mils. In some embodiments, the first membrane 800 has a thickness of 180 mils to 200 mils. In some embodiments, the first membrane 800 has a thickness of 190 mils to 200 mils.

In some embodiments, the first membrane 800 has a thickness of 10 mils to 200 mils. In some embodiments, the first membrane 800 has a thickness of 20 mils to 200 mils. In some embodiments, the first membrane 800 has a thickness of 30 mils to 200 mils. In some embodiments, the first membrane 800 has a thickness of 40 mils to 200 mils. In some embodiments, the first membrane 800 has a thickness of 50 mils to 200 mils. In some embodiments, the first membrane 800 has a thickness of 60 mils to 200 mils. In some embodiments, the first membrane 800 has a thickness of 70 mils to 200 mils. In some embodiments, the first membrane 800 has a thickness of 80 mils to 200 mils. In some embodiments, the first membrane 800 has a thickness of 90 mils to 200 mils. In some embodiments, the first membrane 800 has a thickness of 100 mils to 200 mils.

In some embodiments, the first membrane 800 has a thickness of 110 mils to 200 mils. In some embodiments, the first membrane 800 has a thickness of 120 mils to 200 mils. In some embodiments, the first membrane 800 has a thickness of 130 mils to 200 mils. In some embodiments, the first membrane 800 has a thickness of 140 mils to 200 mils. In some embodiments, the first membrane 800 has a thickness of 150 mils to 200 mils. In some embodiments, the first membrane 800 has a thickness of 160 mils to 200 mils. In some embodiments, the first membrane 800 has a thickness of 170 mils to 200 mils. In some embodiments, the first membrane 800 has a thickness of 180 mils to 200 mils. In some embodiments, the first membrane 800 has a thickness of 190 mils to 200 mils.

In some embodiments, the second membrane 900 has a thickness of 1 mil to 200 mils. In some embodiments, the second membrane 900 has a thickness of 1 mil to 190 mils. In some embodiments, the second membrane 900 has a thickness of 1 mil to 180 mils. In some embodiments, the second membrane 900 has a thickness of 1 mil to 170 mils. In some embodiments, the second membrane 900 has a thickness of 1 mil to 160 mils. In some embodiments, the second membrane 900 has a thickness of 1 mil to 150 mils. In some embodiments, the second membrane 900 has a thickness of 1 mil to 140 mils. In some embodiments, the second membrane 900 has a thickness of 1 mil to 130 mils. In some embodiments, the second membrane 900 has a thickness of 1 mil to 120 mils. In some embodiments, the second membrane 900 has a thickness of 1 mil to 110 mils.

In some embodiments, the second membrane 900 has a thickness of 1 mil to 100 mils. In some embodiments, the second membrane 900 has a thickness of 1 mil to 90 mils. In some embodiments, the second membrane 900 has a thickness of 1 mil to 80 mils. In some embodiments, the second membrane 900 has a thickness of 1 mil to 70 mils. In some embodiments, the second membrane 900 has a thickness of 1 mil to 60 mils. In some embodiments, the second membrane 900 has a thickness of 1 mil to 50 mils. In some embodiments, the second membrane 900 has a thickness of 1 mil to 40 mils. In some embodiments, the second membrane 900 has a thickness of 1 mil to 30 mils. In some embodiments, the second membrane 900 has a thickness of 1 mil to 20 mils. In some embodiments, the second membrane 900 has a thickness of 1 mil to 10 mils.

In some embodiments, the second membrane 900 has a thickness of 110 mils to 200 mils. In some embodiments, the second membrane 900 has a thickness of 120 mils to 200 mils. In some embodiments, the second membrane 900 has a thickness of 130 mils to 200 mils. In some embodiments, the second membrane 900 has a thickness of 140 mils to 200 mils. In some embodiments, the second membrane 900 has a thickness of 150 mils to 200 mils. In some embodiments, the second membrane 900 has a thickness of 160 mils to 200 mils. In some embodiments, the second membrane 900 has a thickness of 170 mils to 200 mils. In some embodiments, the second membrane 900 has a thickness of 180 mils to 200 mils. In some embodiments, the second membrane 900 has a thickness of 190 mils to 200 mils.

In some embodiments, the second membrane 900 has a thickness of 10 mils to 200 mils. In some embodiments, the second membrane 900 has a thickness of 20 mils to 200 mils. In some embodiments, the second membrane 900 has a thickness of 30 mils to 200 mils. In some embodiments, the second membrane 900 has a thickness of 40 mils to 200 mils. In some embodiments, the second membrane 900 has a thickness of 50 mils to 200 mils. In some embodiments, the second membrane 900 has a thickness of 60 mils to 200 mils. In some embodiments, the second membrane 900 has a thickness of 70 mils to 200 mils. In some embodiments, the second membrane 900 has a thickness of 80 mils to 200 mils. In some embodiments, the second membrane 900 has a thickness of 90 mils to 200 mils. In some embodiments, the second membrane 900 has a thickness of 100 mils to 200 mils.

In some embodiments, the second membrane 900 has a thickness of 110 mils to 200 mils. In some embodiments, the second membrane 900 has a thickness of 120 mils to 200 mils. In some embodiments, the second membrane 900 has a thickness of 130 mils to 200 mils. In some embodiments, the second membrane 900 has a thickness of 140 mils to 200 mils. In some embodiments, the second membrane 900 has a thickness of 150 mils to 200 mils. In some embodiments, the second membrane 900 has a thickness of 160 mils to 200 mils. In some embodiments, the second membrane 900 has a thickness of 170 mils to 200 mils. In some embodiments, the second membrane 900 has a thickness of 180 mils to 200 mils. In some embodiments, the second membrane 900 has a thickness of 190 mils to 200 mils.

Figure 4A:
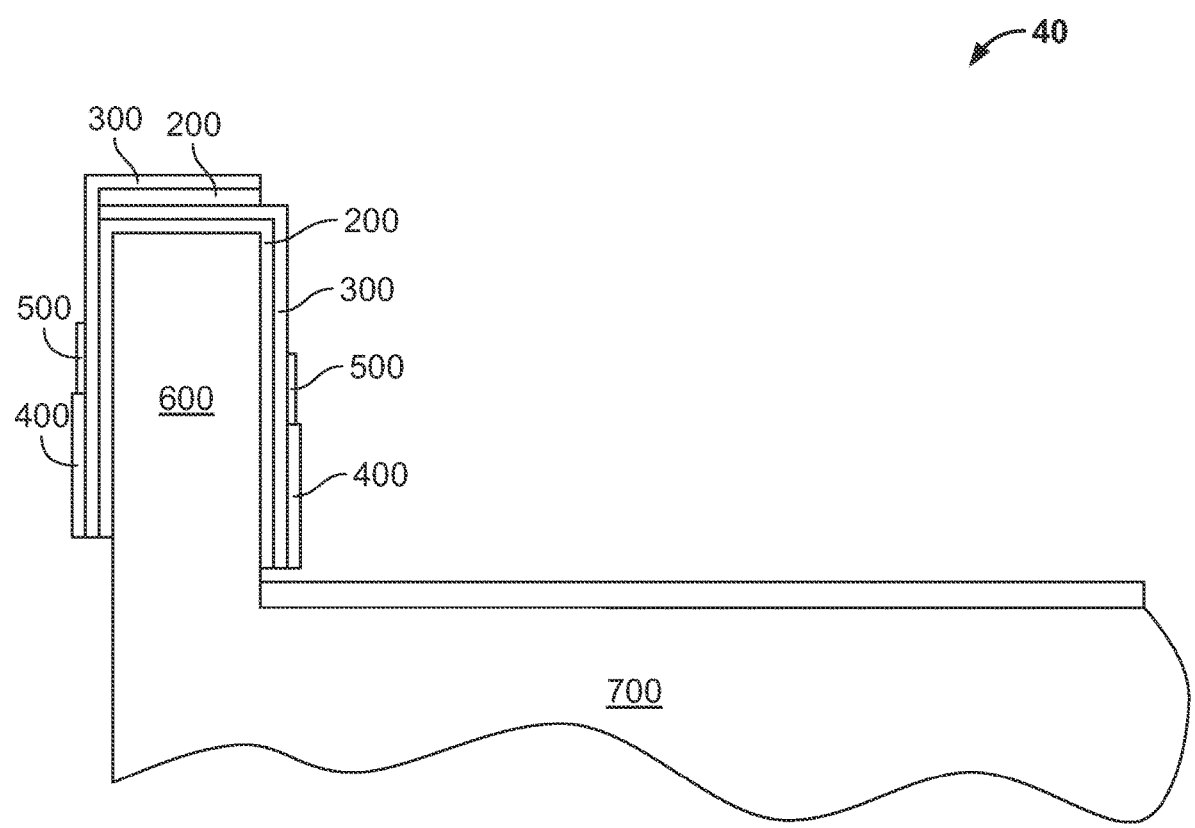
FIGS. 4A-4C are cross-sectional views of a flashing assembly at various stages of being installed on a parapet wall, according to some embodiments.
Figure 4B:
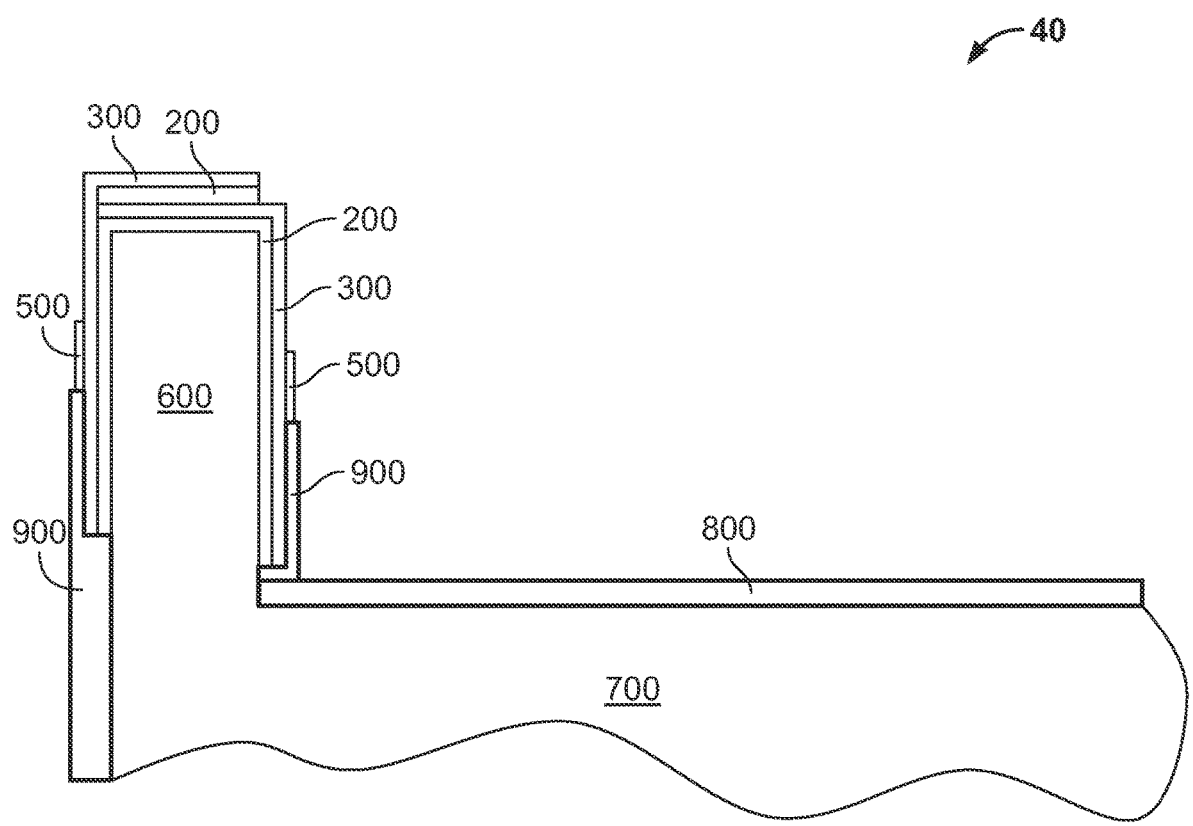
Figure 4C:
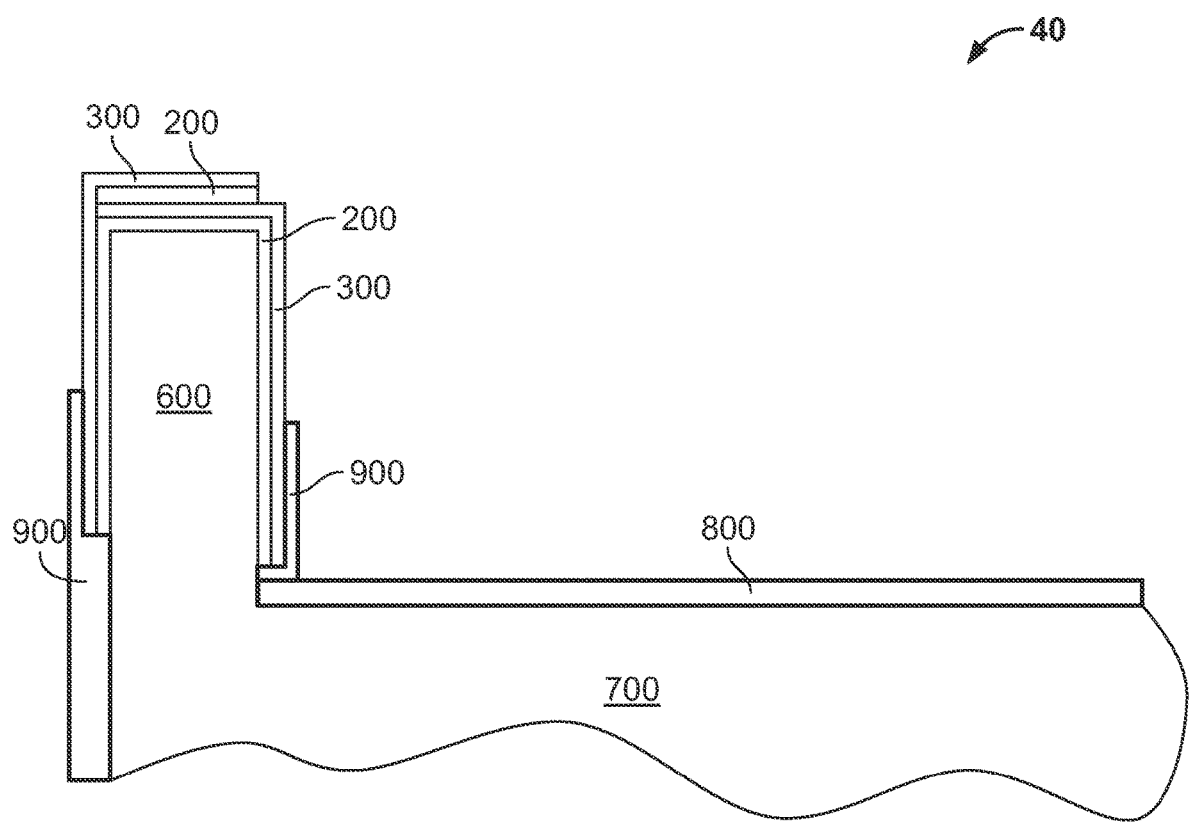

FIGS. 4A-4C show another embodiment of a flashing system 40 at various stages of an installation process. As shown, the flashing system 40 is similar to the flashing system 30 discussed above with respect to FIGS. 3A-3C, except the flashing system 40 further comprises a second flashing assembly 10 installed on the parapet wall 600 in an overlapping relationship with the first flashing assembly 10. For simplicity, some of the differences between the flashing system 30 and the flashing system 20 are discussed herein. However, it will be appreciated that other differences may exist without departing from the scope of this disclosure.

Returning now to FIG. 4A, the second flashing assembly 10 is shown installed on the parapet wall 600 with the fleece layer 400 facing away from the roof deck 700. In FIG. 4B, a third membrane 900 is shown installed on the second flashing assembly 10, forming a water-resistant seal therewith. In FIG. 4C, the flashing system 30 is shown fully installed on the building structure, with the tape 500 removed from both the first flashing assembly 10 and the second flashing assembly 10. In some embodiments, the second flashing assembly 10 is the same as the first flashing assembly 10. In some embodiments, the second flashing assembly 10 is different from the first flashing assembly 10.

In some embodiments, the second attachment layer 200 of the second flashing assembly 10 comprises a first portion and a second portion. In some embodiments, the first portion of the second attachment layer 200 directly contacts the first flashing layer 300 of the first flashing assembly 100 and the second portion of the second attachment layer 200 directly contacts the parapet wall 600. In some embodiments, the first portion of the second attachment layer 200 attaches the flashing assembly 10 to the first flashing layer 300 of the first flashing assembly 100 and the second portion of the second attachment layer 200 attaches the flashing assembly 10 to the parapet wall 600. In some embodiments, the first portion of the second attachment layer 200 adheres the flashing assembly 10 to the first flashing layer 300 of the first flashing assembly 100 and the second portion of the second attachment layer 200 adheres the flashing assembly 10 to the parapet wall 600. In some embodiments, the first portion of the second attachment layer 200 bonds the flashing assembly 10 to the first flashing layer 300 of the first flashing assembly 100 and the second portion of the second attachment layer 200 bonds the flashing assembly 10 to the parapet wall 600. In some embodiments, the first portion of the second attachment layer 200 secures or fastens the flashing assembly 10 to the first flashing layer 300 of the first flashing assembly 100 and the second portion of the second attachment layer 200 secures or fastens the flashing assembly 10 to the parapet wall 600. In some embodiments, the first portion of the second attachment layer 200 covers the first flashing layer 300 of the first flashing assembly 100 and the second portion of the second attachment layer 200 covers the parapet wall 600. In some embodiments, the first portion of the second attachment layer 200 covers the second side of the parapet wall 600 and the second portion of the second attachment layer 200 covers the top surface and/or the first side of the parapet wall. In some embodiments, an intervening layer is located between the second attachment layer 200 and the first flashing layer 300 of the first flashing assembly. In some embodiments, an intervening layer is located between the second attachment layer 200 and the parapet wall 600.

In some embodiments, the second fleece layer 400 of the second flashing assembly 10 covers the parapet wall 600. In some embodiments, the second fleece layer 400 of the second flashing assembly 10 covers the second side of the parapet wall 600. In some embodiments, the second fleece layer 400 of the second flashing assembly 10 covers the top surface of the parapet wall 600. In some embodiments, the second fleece layer 400 of the second flashing assembly 10 covers the second side and the top surface of the parapet wall 600. In some embodiments, the second fleece layer 400 of the second flashing assembly 10 does not cover the first side of the parapet wall 600. In some embodiments, the second fleece layer 400 of the second flashing assembly 10 does not cover the top surface of the parapet wall 600.

In some embodiments, the third membrane 900 is located on the second fleece layer 400 of the second flashing assembly 10. In some embodiments, the third membrane 900 covers all or at least a portion of the second fleece layer 400 of the second flashing assembly 10. In some embodiments, the third membrane 900 directly contacts the second fleece layer 400 of the second flashing assembly 10. In some embodiments, the third membrane 900 contacts the second fleece layer 400 of the second flashing assembly 10 so as to form a water resistant seal between the second flashing assembly 10 and the third membrane 900. In some embodiments, the third membrane 900 is a liquid applied membrane, wherein the liquid applied membrane is embedded into the fleece layer 400 of the second flashing assembly 10, so as to obtain an in situ composite membrane. In some embodiments, the third membrane 900 is not a liquid applied membrane. For example, in some embodiments, the third membrane 900 is a single ply membrane. In some embodiments, the third membrane 900 is a TPO membrane. In some embodiments, the third membrane 900 is an EPDM membrane. In some embodiments, the third membrane 900 is a PVC membrane.

Although the second flashing assembly 10 overlaps the first flashing assembly 10 in the embodiments discussed above, in some embodiments, the first flashing assembly 10 overlaps the second flashing assembly 10.

Figure 5A:
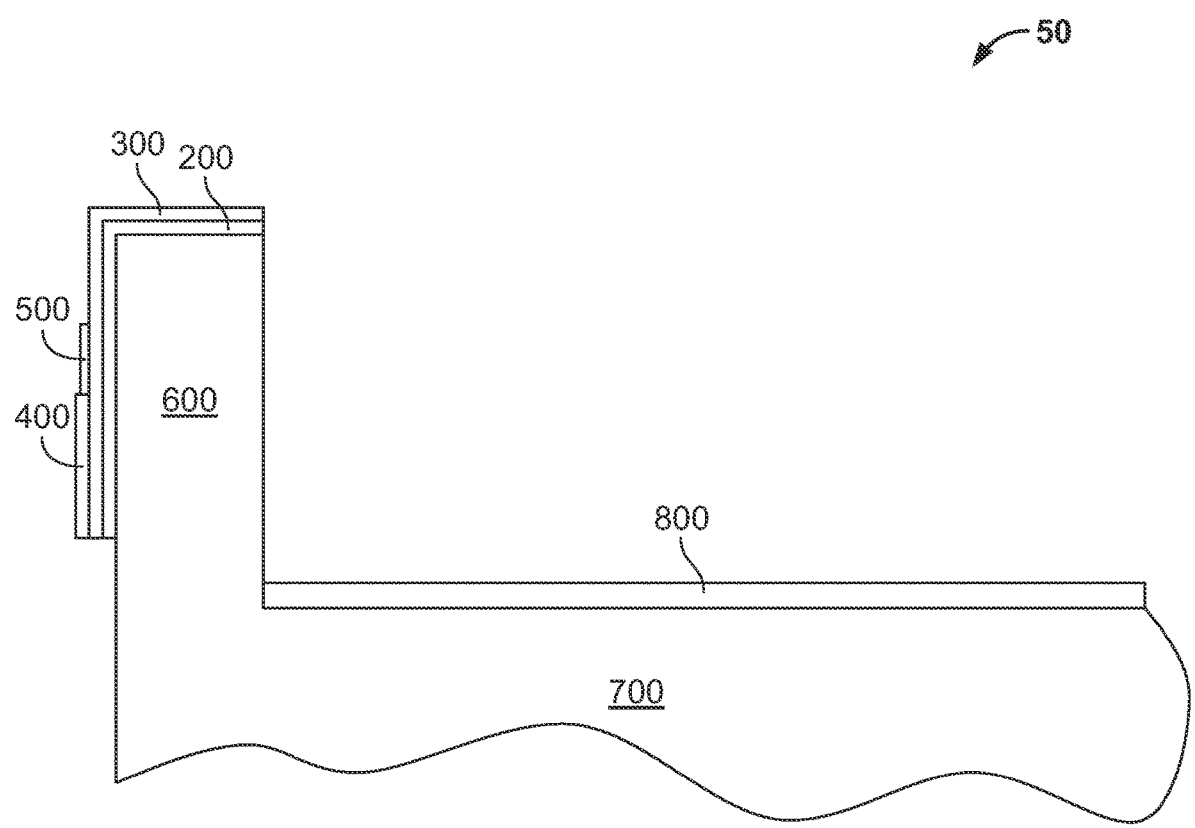
FIGS. 5A-5C are cross-sectional views of a flashing assembly at various stages of being installed on a parapet wall, according to some embodiments.
Figure 5B:
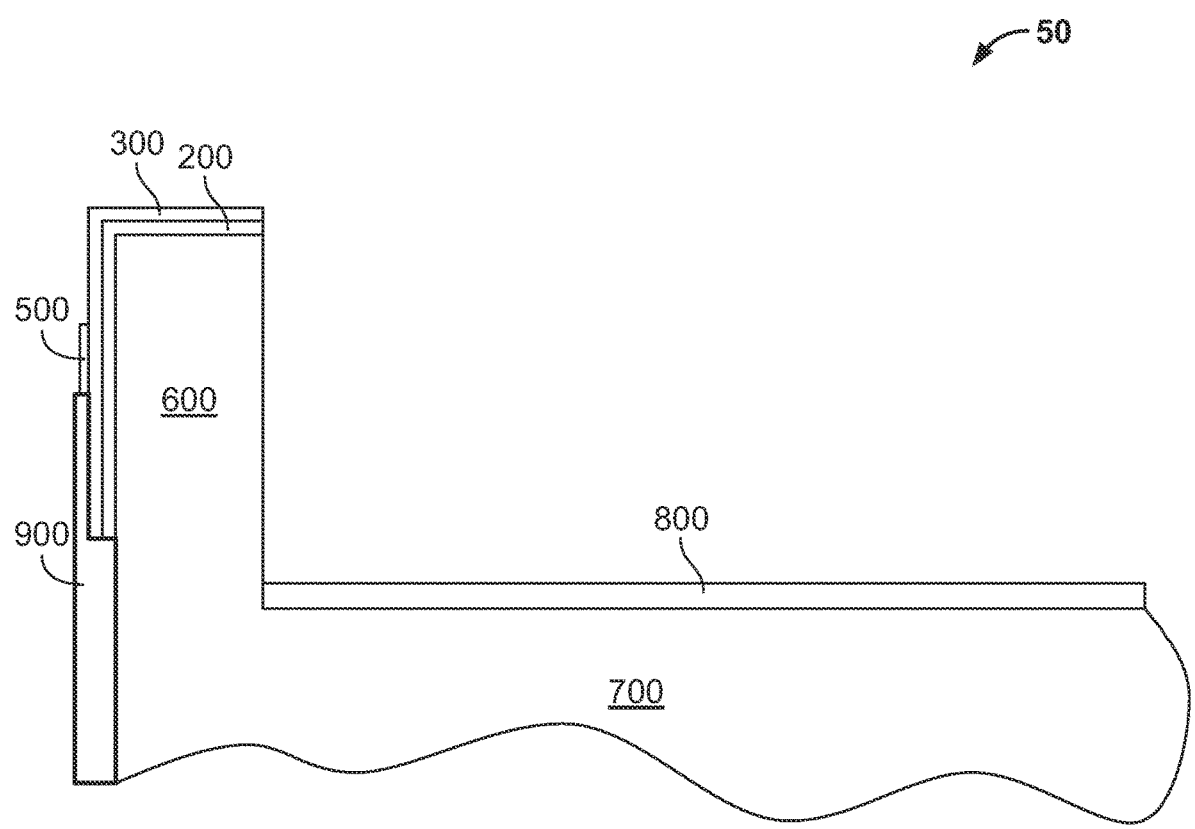
Figure 5C:
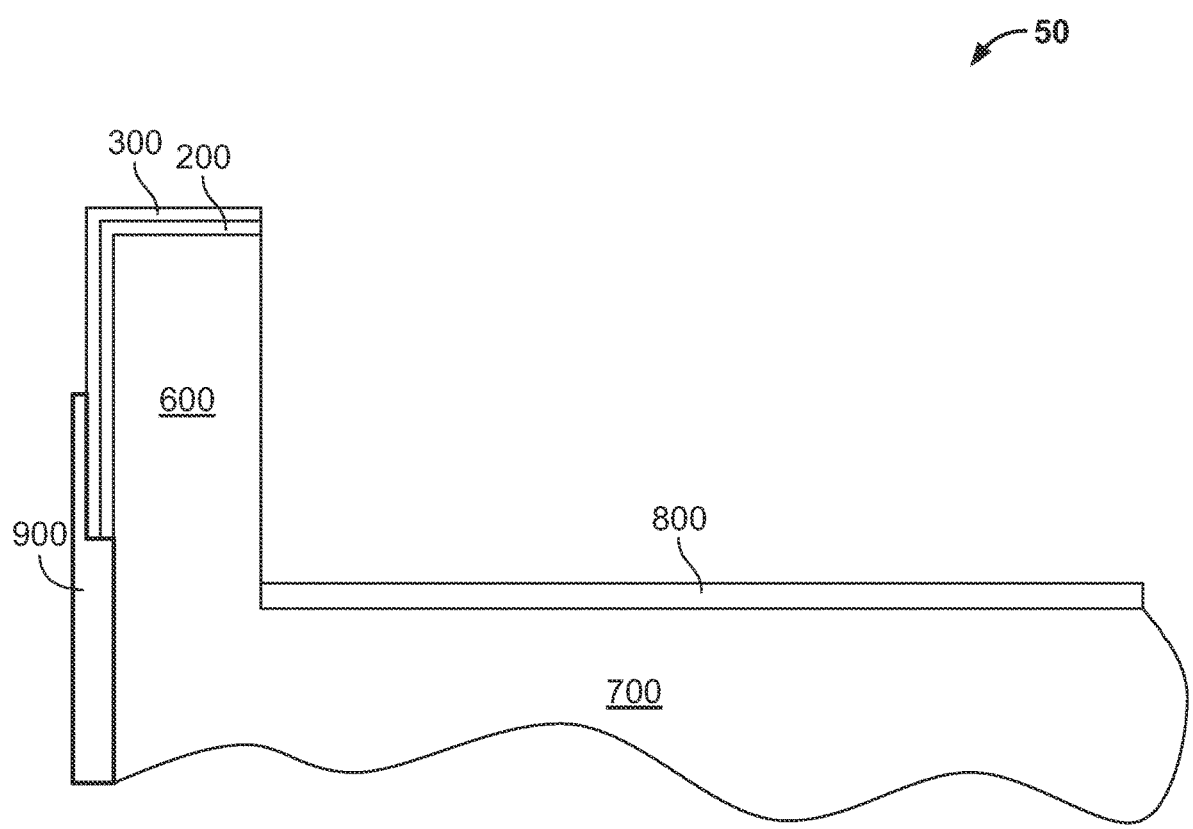

FIGS. 5A-5C show another embodiment of a flashing system 40 at various stages of an installation process. In FIG. 5A, a first flashing assembly 10 is shown installed on the parapet wall 600 with the fleece layer 400 facing away from the roof deck 700, and a first membrane 800 is shown installed on the roof deck 700. In FIG. 5B, a second membrane 900 is shown installed on the first flashing assembly 10 so as to form a water-resistant seal therewith. In FIG. 5C, the flashing system 40 is shown fully installed on the building structure, with the tape 500 removed from the first flashing assembly 10.

In some embodiments, the first attachment layer 200 of the first flashing assembly 10 directly contacts the parapet wall 600. In some embodiments, the first attachment layer 200 of the first flashing assembly 10 attaches the first flashing assembly 10 to the parapet wall 600. In some embodiments, the first attachment layer 200 of the first flashing assembly 10 adheres the first flashing assembly 10 to the parapet wall 600. In some embodiments, the first attachment layer 200 of the first flashing assembly 10 bonds the first flashing assembly 10 to the parapet wall 600. In some embodiments, the first attachment layer 200 of the first flashing assembly 10 secures or fastens the first flashing assembly 10 to the parapet wall 600. In some embodiments, the first attachment layer 200 of the first flashing assembly 10 covers the parapet wall 600. In some embodiments, the first attachment layer 200 of the first flashing assembly 10 covers the first side of the parapet wall 600. In some embodiments, the first attachment layer 200 of the first flashing assembly 10 covers the second side of the parapet wall 600. In some embodiments, the first attachment layer 200 of the first flashing assembly 10 covers the top surface of the parapet wall 600. In some embodiments, an intervening layer is located between the first attachment layer 200 of the first flashing assembly 10 and the parapet wall 600.

In some embodiments, the first attachment layer 200 of the first flashing assembly 10 directly contacts at least a portion of the parapet wall 600. In some embodiments, the first attachment layer 200 of the first flashing assembly 10 contacts the first side of the parapet wall 600. In some embodiments, the first attachment layer 200 of the first flashing assembly 10 contacts the top surface of the parapet wall 600. In some embodiments, the first attachment layer 200 of the first flashing assembly 10 contacts the second side of the parapet wall 600. In some embodiments, the first attachment layer 200 of the first flashing assembly 10 does not contact at least one of the first side, the second side, or the top surface of the parapet wall 600. In some embodiments, an intervening layer is positioned between the first attachment layer 200 of the first flashing assembly 10 and the parapet wall 600.

In some embodiments, the first fleece layer 400 of the first flashing assembly 10 covers the parapet wall 600. In some embodiments, the first fleece layer 400 of the first flashing assembly 10 covers the second side of the parapet wall 600. In some embodiments, the first fleece layer 400 of the first flashing assembly 10 covers the top surface of the parapet wall 600. In some embodiments, the first fleece layer 400 of the first flashing assembly 10 covers the second side of the parapet wall 600 and the top surface of the parapet wall. In some embodiments, the first fleece layer 400 of the first flashing assembly 10 does not cover the roof deck 700. In some embodiments, the first fleece layer 400 of the first flashing assembly 10 does not cover the first side of the parapet wall 600. In some embodiments, the first fleece layer 400 of the first flashing assembly 10 does not cover the top surface of the parapet wall 600.

In some embodiments, the second membrane 900 is located on the fleece layer 400 of the first flashing assembly 10. In some embodiments, the second membrane 900 covers all or at least a portion of the fleece layer 400 of the first flashing assembly 10. In some embodiments, the second membrane 900 directly contacts the first fleece layer 400 of the first flashing assembly 10. In some embodiments, the second membrane 900 contacts the first fleece layer 400 of the first flashing assembly 10, so as to form a water-resistant seal therewith. In some embodiments, the second membrane 900 is a liquid applied membrane, wherein the liquid applied membrane is embedded into the fleece layer 400 of the first flashing assembly 10, so as to obtain an in situ composite membrane. In some embodiments, the second membrane 900 is not a liquid applied membrane. For example, in some embodiments, the second membrane 900 is a single ply membrane. In some embodiments, the second membrane 900 is a TPO membrane. In some embodiments, the second membrane 900 is an EPDM membrane. In some embodiments, the second membrane 900 is a PVC membrane.

Figure 6A:
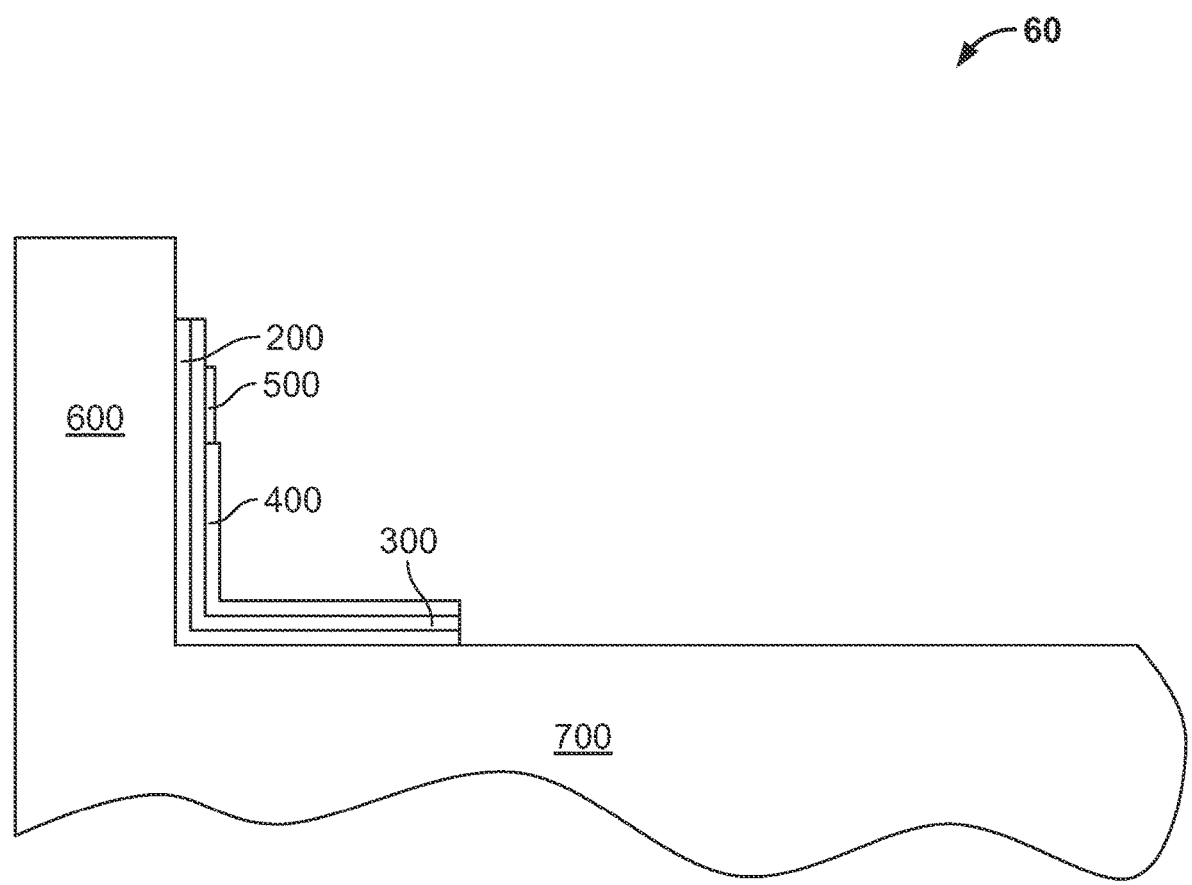
FIGS. 6A-6C are cross-sectional views of a flashing assembly at various stages of being installed on a parapet wall, according to some embodiments.
Figure 6B:
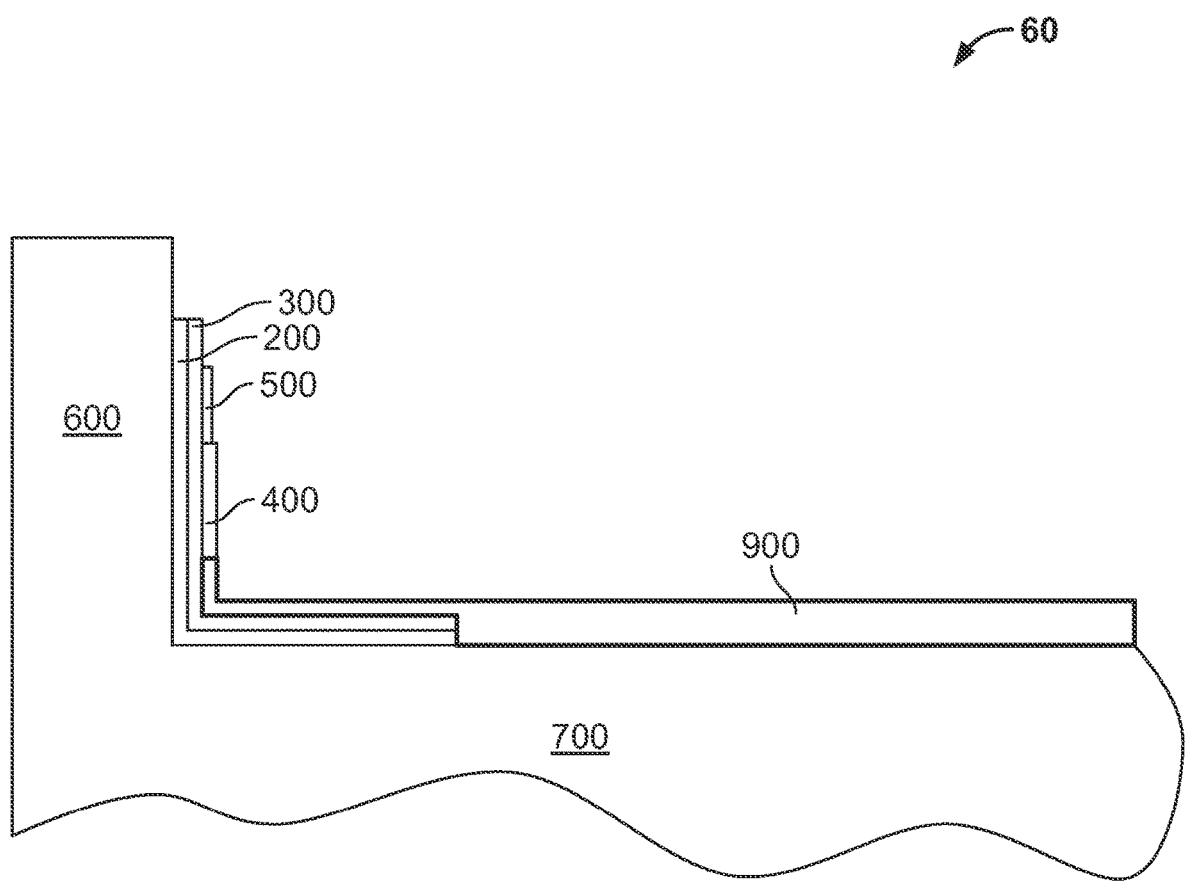
Figure 6C:
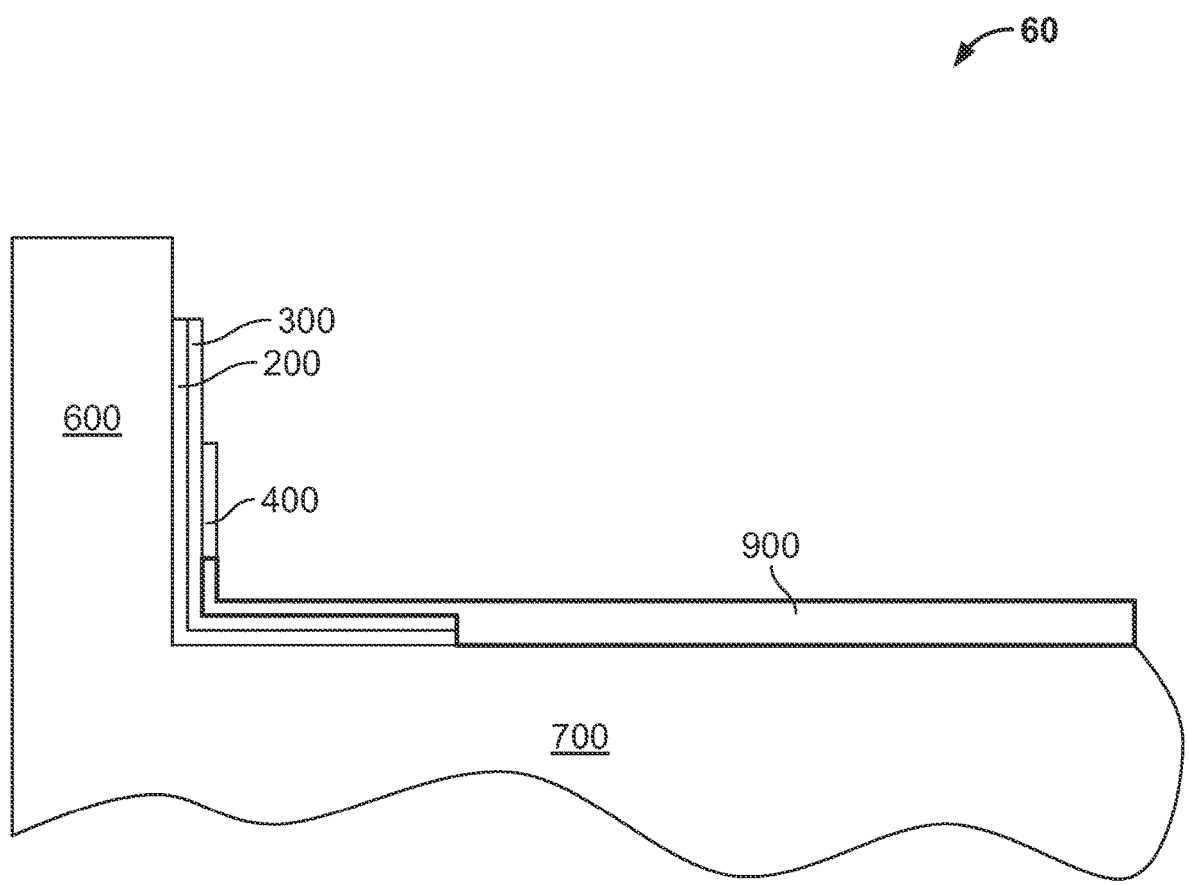

FIGS. 6A-6C show another embodiment of a flashing system 60 at various stages of an installation process. In FIG. 6A, a flashing assembly 10 is shown installed on the parapet wall 600 and on the roof deck 700. In FIG. 6B, a membrane 900 is shown installed on the fleece layer 400 of the flashing assembly 10 and on the roof deck 700, so as to form a water-resistant seal therewith. In FIG. 6C, the flashing system 60 is shown fully installed on the building structure, with the tape 500 removed from the flashing assembly 10.

In some embodiments, the attachment layer 200 of the flashing assembly 10 comprises a first portion and a second portion. In some embodiments, the first portion of the attachment layer 200 directly contacts the parapet wall 600 and the second portion of the attachment layer 200 directly contacts the roof deck 700. In some embodiments, the first portion of the attachment layer 200 attaches the flashing assembly 10 to the parapet wall 600 and the second portion of the attachment layer 200 attaches the flashing assembly 10 to the roof deck 700. In some embodiments, the first portion of the attachment layer 200 adheres the flashing assembly 10 to the parapet wall 600 and the second portion of the attachment layer 200 adheres the flashing assembly 10 to the roof deck 700. In some embodiments, the first portion of the attachment layer 200 bonds the flashing assembly 10 to the parapet wall 600 and the second portion of the attachment layer 200 bonds the flashing assembly 10 to the roof deck 700. In some embodiments, the first portion of the attachment layer 200 secures or fastens the flashing assembly 10 to the parapet wall 600 and the second portion of the attachment layer 200 secures or fastens the flashing assembly 10 to the roof deck 700. In some embodiments, the first portion of the attachment layer 200 covers the parapet wall 600 and the second portion of the attachment layer 200 covers the roof deck 700. In some embodiments, the first portion of the attachment layer 200 covers the first side of the parapet wall 600 and the second portion of the attachment layer 200 covers the roof deck 700. In some embodiments, the first portion of the attachment layer 200 covers the first side and the top surface of the parapet wall 600 and the second portion of the attachment layer 200 covers the roof deck 700. In some embodiments, an intervening layer is located between the attachment layer 200 and the parapet wall 600. In some embodiments, an intervening layer is located between the attachment layer 200 and the roof deck 700.

In some embodiments, the fleece layer 400 of the flashing assembly 10 covers the parapet wall 600. In some embodiments, the fleece layer 400 of the flashing assembly 10 covers the first side of the parapet wall 600. In some embodiments, the fleece layer 400 of the flashing assembly 10 covers the roof deck 700. In some embodiments, the fleece layer 400 of the flashing assembly 10 covers the parapet wall 600 and the roof deck 700. In some embodiments, the fleece layer 400 of the flashing assembly 10 covers the first side of the parapet wall 600 and the roof deck 700. In some embodiments, the fleece layer 400 of the flashing assembly 10 does not cover the parapet wall 600. In some embodiments, the fleece layer 400 of the flashing assembly 10 does not cover the second side of the parapet wall 600. In some embodiments, the fleece layer 400 of the flashing assembly 10 does not cover the first side of the parapet wall 600.

In some embodiments, the membrane 900 is located on the fleece layer 400 of the flashing assembly 10. In some embodiments, the membrane 900 covers all or at least a portion of the fleece layer 400 of the flashing assembly 10. In some embodiments, the membrane 900 comprises contacts the fleece layer 400 so as to form a water resistant seal with the flashing assembly 10. In some embodiments, the membrane 900 directly contacts the roof deck 700. In some embodiments, an intervening layer is located between the membrane 900 and the roof deck 700. In some embodiments, the membrane 900 is a liquid applied membrane, wherein the liquid applied membrane is embedded into the fleece layer 400 of the flashing assembly 10, so as to obtain an in situ composite membrane. In some embodiments, the membrane 900 is not a liquid applied membrane. For example, in some embodiments, the membrane 900 is a single ply membrane. In some embodiments, the membrane 900 is a TPO membrane. In some embodiments, the membrane 900 is an EPDM membrane. In some embodiments, the membrane 900 is a PVC membrane.

Figure 7A:
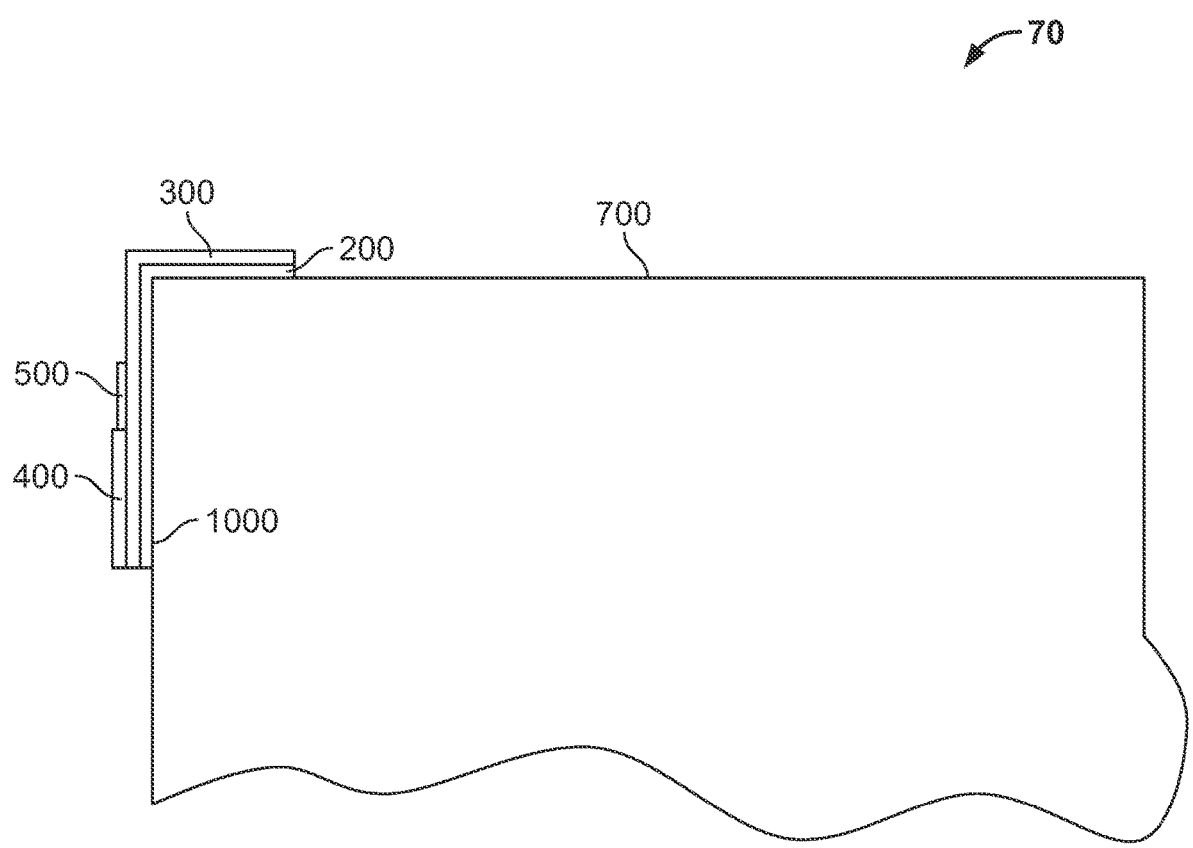
FIGS. 7A-7C are cross-sectional views of a flashing assembly at various stages of being installed on a roof edge, according to some embodiments.
Figure 7B:
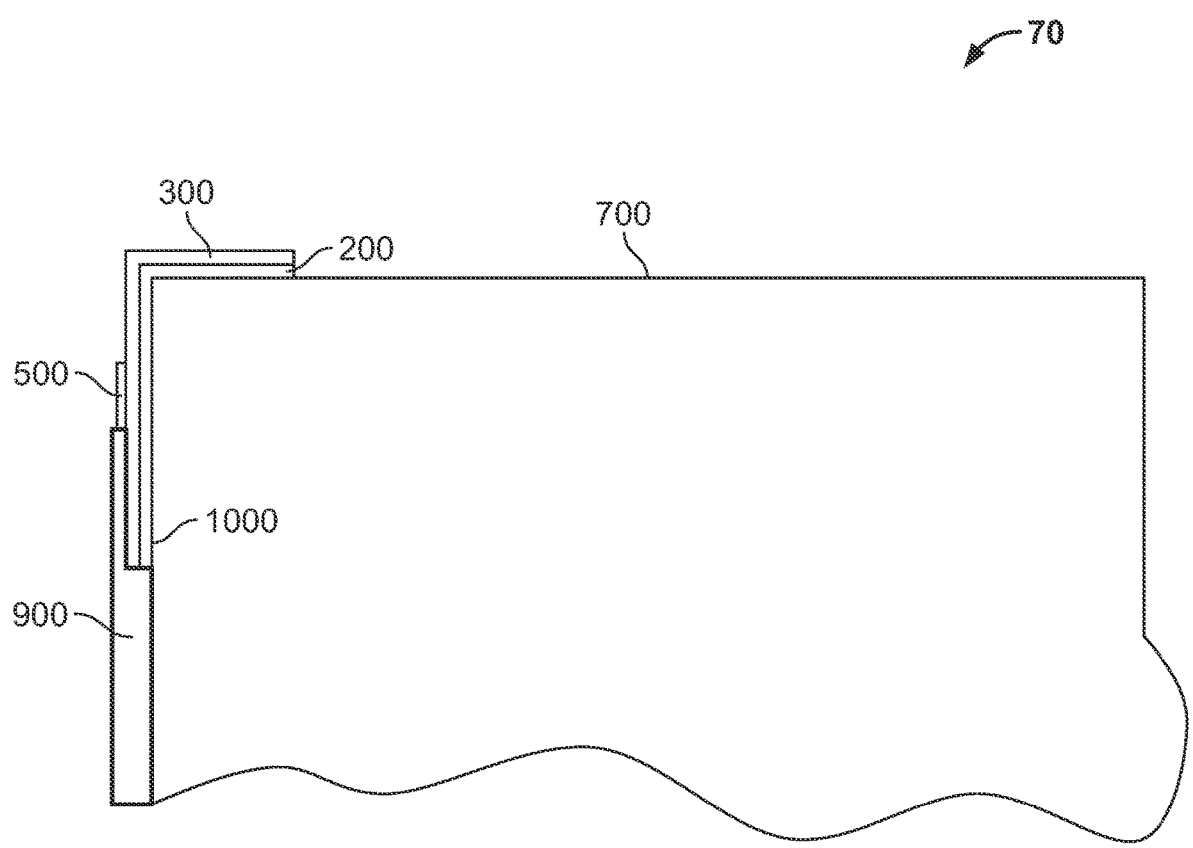
Figure 7C:
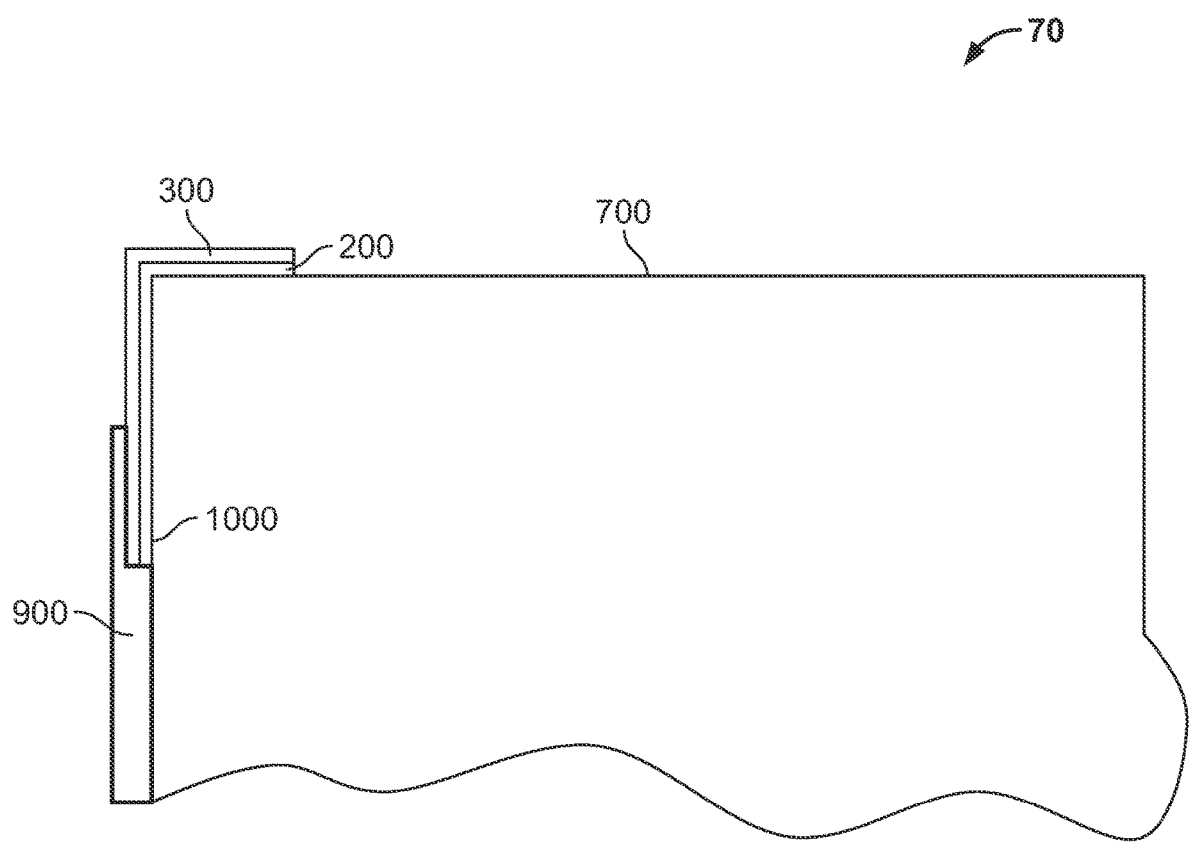

With reference to FIGS. 7A-7C, a flashing system 70 is shown at various stages of an installation process, according to some embodiments. As shown, the flashing system 70 comprises a flashing assembly 10 installed on a roof deck 700 without a parapet wall. That is, the flashing assembly 10 is shown installed on a roof deck 700 and a building wall 1000 which extends downwards from the roof deck. In some embodiments, the point at which the roof deck 700 and the building wall 1000 meet is referred to as a roof edge. In FIG. 6A, the flashing assembly 10 is shown on the roof deck 700 and the building wall 1000 with the fleece layer 400 facing away from the roof deck 700. In FIG. 6B, a second membrane 900 is shown installed on the flashing assembly 10, forming a water-resistant seal therewith. In FIG. 6C, the flashing system 60 is shown fully installed on the building structure, with the tape 500 removed from the flashing assembly 10.

In some embodiments, the attachment layer 200 of the flashing assembly 10 comprises a first portion and a second portion. In some embodiments, the first portion of the attachment layer 200 directly contacts the roof deck 700 and the second portion of the attachment layer 200 directly contacts the building wall 1000. In some embodiments, the first portion of the attachment layer 200 attaches the flashing assembly 10 to the roof deck 700 and the second portion of the attachment layer 200 attaches the flashing assembly 10 to the building wall 1000. In some embodiments, the first portion of the attachment layer 200 adheres the flashing assembly 10 to the roof deck 700 and the second portion of the attachment layer 200 adheres the flashing assembly 10 to the building wall 1000. In some embodiments, the first portion of the attachment layer 200 bonds the flashing assembly 10 to the roof deck 700 and the second portion of the attachment layer 200 bonds the flashing assembly 10 to the building wall 1000. In some embodiments, the first portion of the attachment layer 200 secures or fastens the flashing assembly 10 to the roof deck 700 and the second portion of the attachment layer 200 secures or fastens the flashing assembly 10 to the building wall 1000. In some embodiments, the first portion of the attachment layer 200 covers the roof deck 700 and the second portion of the attachment layer 200 covers the building wall 1000. In some embodiments, the first portion of the attachment layer 200 covers the first side of the roof deck 700 and the second portion of the attachment layer 200 covers the building wall 1000. In some embodiments, an intervening layer is located between the attachment layer 200 and the roof deck 700. In some embodiments, an intervening layer is located between the attachment layer 200 and the building wall 1000.

In some embodiments, the fleece layer 400 of the flashing assembly 10 covers the roof deck 700. In some embodiments, the fleece layer 400 of the flashing assembly 10 covers the building wall 1000. In some embodiments, the fleece layer 400 of the flashing assembly 10 covers the roof deck 700 and the building wall 1000. In some embodiments, the fleece layer 400 of the flashing assembly 10 does not cover the roof deck 700.

In some embodiments, the membrane 900 is located on the fleece layer 400 of the flashing assembly 10. In some embodiments, the membrane 900 covers all or at least a portion of the fleece layer 400 of the flashing assembly 10. In some embodiments, the membrane 900 contacts the fleece layer 400 so as to form a water resistant seal with the flashing assembly 10. In some embodiments, the membrane 900 directly contacts the building wall 1000. In some embodiments, an intervening layer is located between the membrane 900 and the building wall 1000. In some embodiments, the membrane 900 does not cover the roof deck 700. In some embodiments, the membrane 900 is a liquid applied membrane, wherein the liquid applied membrane is embedded into the fleece layer 400 of the flashing assembly 10, so as to obtain an in situ composite membrane. In some embodiments, the membrane 900 is not a liquid applied membrane. For example, in some embodiments, the membrane 900 is a single ply membrane. In some embodiments, the membrane 900 is a TPO membrane. In some embodiments, the membrane 900 is an EPDM membrane. In some embodiments, the membrane 900 is a PVC membrane.

Figure 8A:
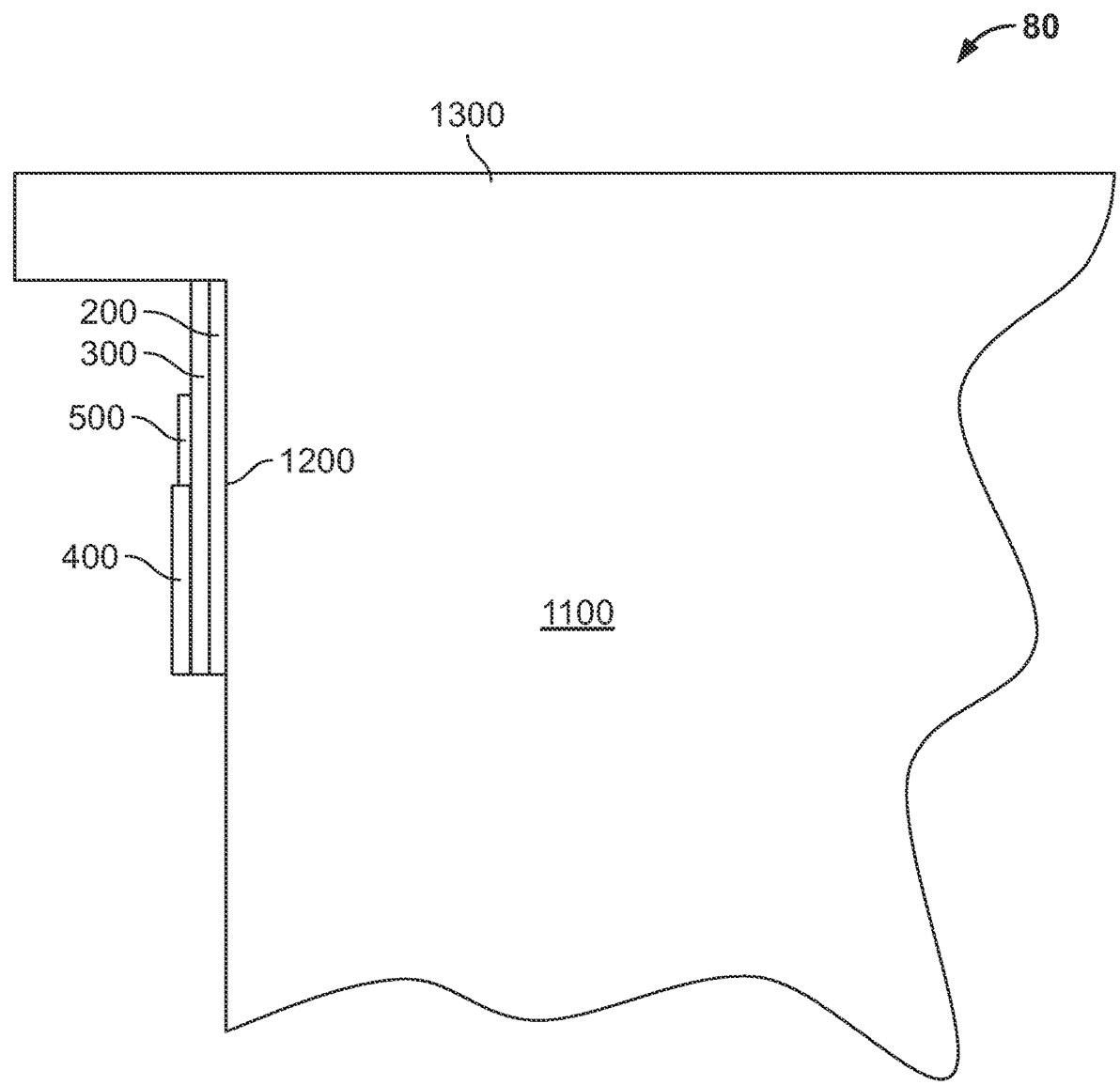
FIGS. 8A-8C are cross-sectional views of a flashing assembly at various stages of being installed on a roof skylight, according to some embodiments.
Figure 8B:
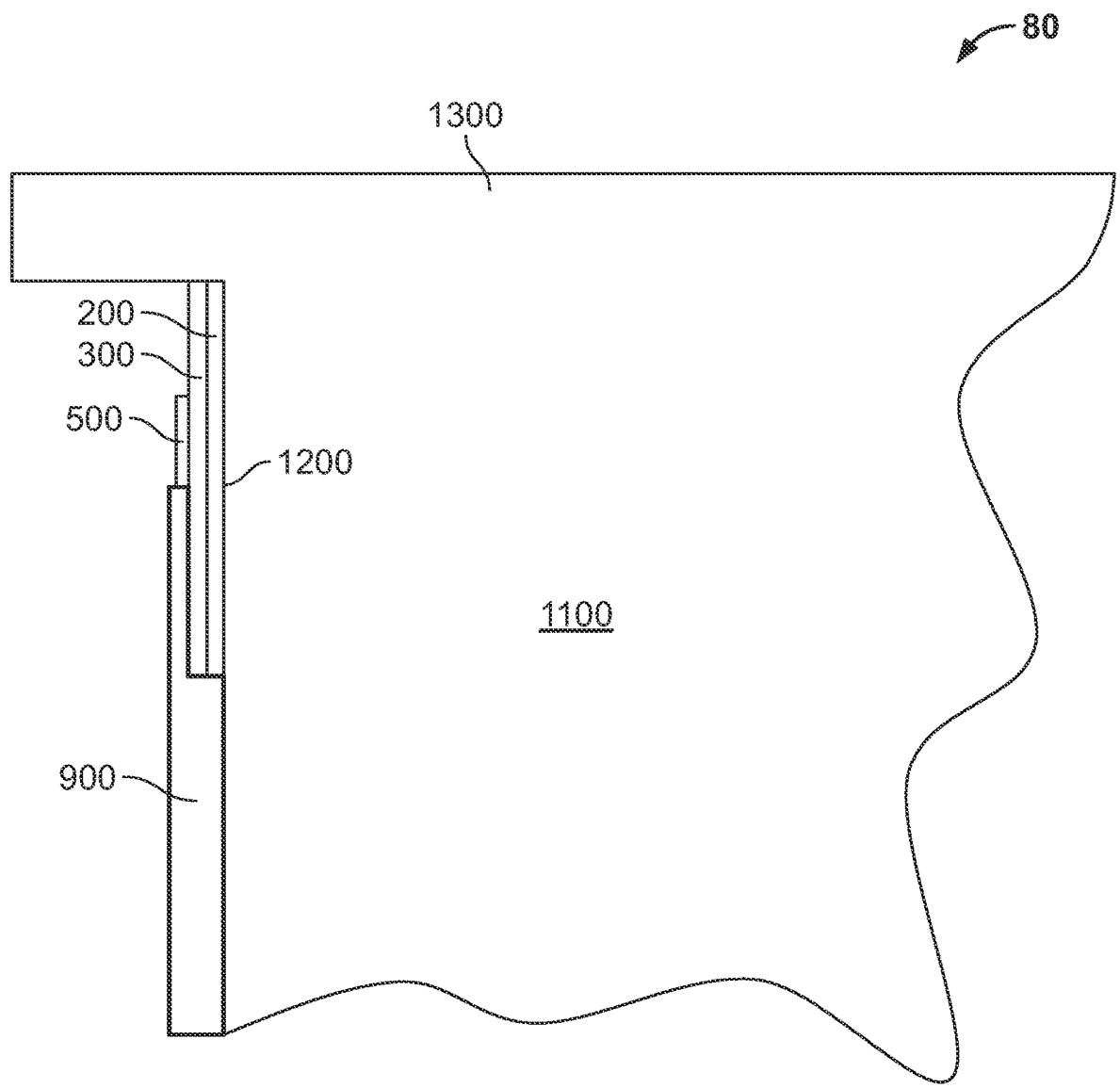
Figure 8C:
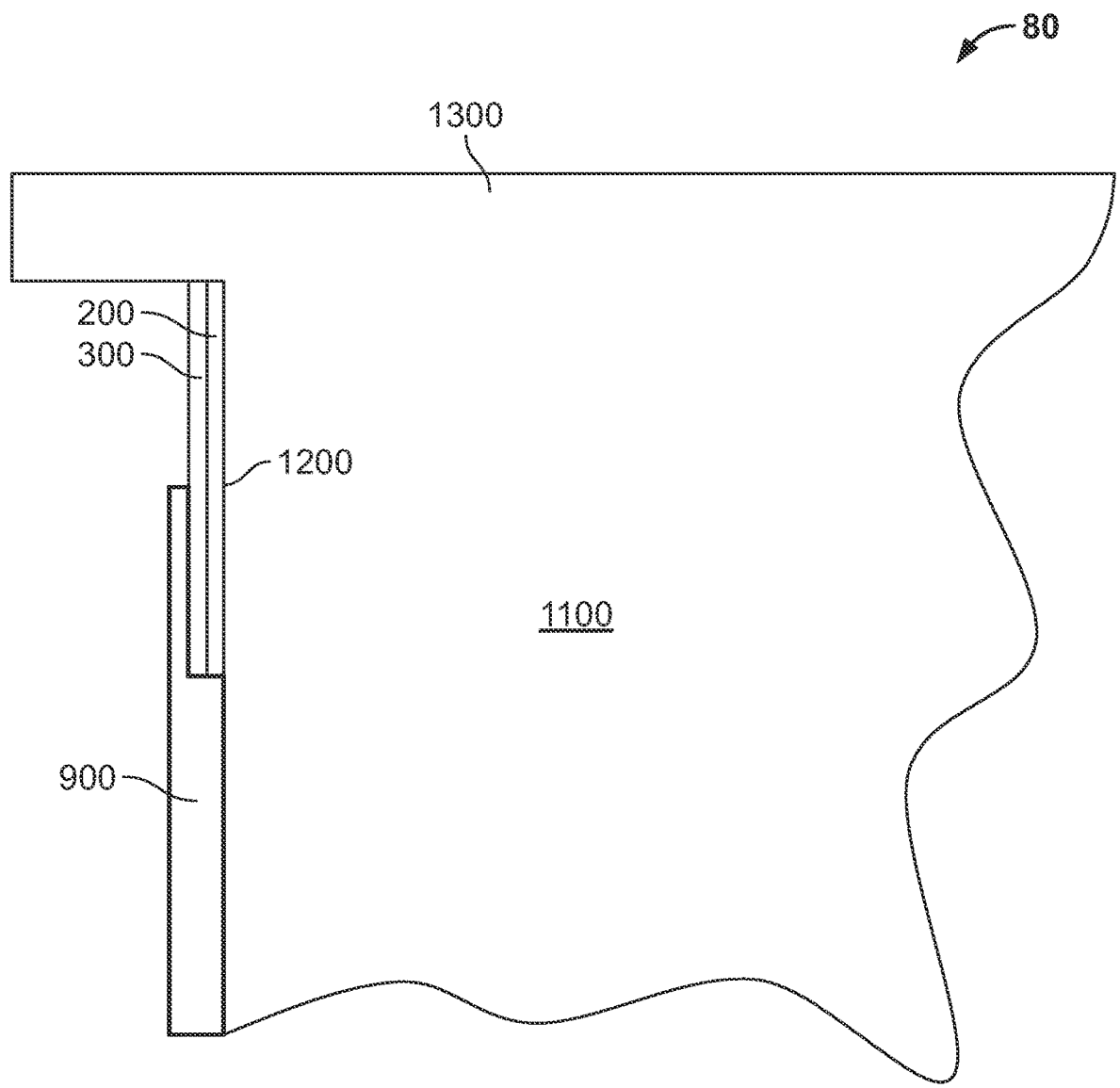

With reference to FIGS. 8A-8C, a flashing system 80 is shown at various stages of an installation process, according to some embodiments. As shown, the flashing system 80 comprises a flashing assembly 10 installed on a skylight structure 1100. That is, the flashing assembly 10 is shown installed on a skylight wall 1200 of the skylight structure 1100, which has an overhang portion 1300 extending over and above the skylight wall 1200 of the skylight structure 1100. In FIG. 8A, the flashing assembly 10 is shown installed on the skylight wall 1200 of the skylight structure 1100. In FIG. 8B, a second membrane 900 is shown installed on the flashing assembly 10, forming a water-resistant seal therewith. In FIG. 8C, the flashing system 80 is shown fully installed on the skylight structure 1100, with the tape 500 removed from the flashing assembly 10.

In some embodiments, the first portion of the attachment layer 200 directly contacts the skylight wall 1200. In some embodiments, the attachment layer 200 attaches the flashing assembly 10 to the skylight wall 1200. In some embodiments, the attachment layer 200 adheres the flashing assembly 10 to the skylight wall 1200. In some embodiments, the attachment layer 200 bonds the flashing assembly 10 to the skylight wall 1200. In some embodiments, the attachment layer 200 secures or fastens the flashing assembly 10 to the skylight wall 1200. In some embodiments, the attachment layer 200 covers the skylight wall 1200. In some embodiments, the attachment layer 200 has a first portion and a second portion. In some embodiments, the first portion of the attachment layer 200 covers the skylight wall 1200 and the second portion of the attachment layer 200 covers the overhang portion 1300. In some embodiments, an intervening layer is located between the attachment layer 200 and the skylight wall 1200. In some embodiments, an intervening layer is located between the attachment layer 200 and the building wall 1000.

In some embodiments, the fleece layer 400 of the flashing assembly 10 covers the skylight wall 1200. In some embodiments, the fleece layer 400 of the flashing assembly 10 covers the overhand portion 1300. In some embodiments, the fleece layer 400 of the flashing assembly 10 covers the skylight wall 1200 and the overhand portion 1300. In some embodiments, the fleece layer 400 of the flashing assembly 10 does not cover the overhand portion 1300.

In some embodiments, the membrane 900 is located on the fleece layer 400 of the flashing assembly 10. In some embodiments, the membrane 900 covers all or at least a portion of the fleece layer 400 of the flashing assembly 10. In some embodiments, the membrane 900 contacts the fleece layer 400 so as to form a water resistant seal with the flashing assembly 10. In some embodiments, the membrane 900 directly contacts the skylight wall 1200. In some embodiments, an intervening layer is located between the membrane 900 and the skylight wall 1200. In some embodiments, the membrane 900 directly contacts the fleece layer 400. In some embodiments, the membrane 900 does not cover the overhand portion 1300. In some embodiments, the membrane 900 is a liquid applied membrane, wherein the liquid applied membrane is embedded into the fleece layer 400 of the flashing assembly 10, so as to obtain an in situ composite membrane. In some embodiments, the membrane 900 is not a liquid applied membrane. For example, in some embodiments, the membrane 900 is a single ply membrane. In some embodiments, the membrane 900 is a TPO membrane. In some embodiments, the membrane 900 is an EPDM membrane. In some embodiments, the membrane 900 is a PVC membrane.

Figure 9:
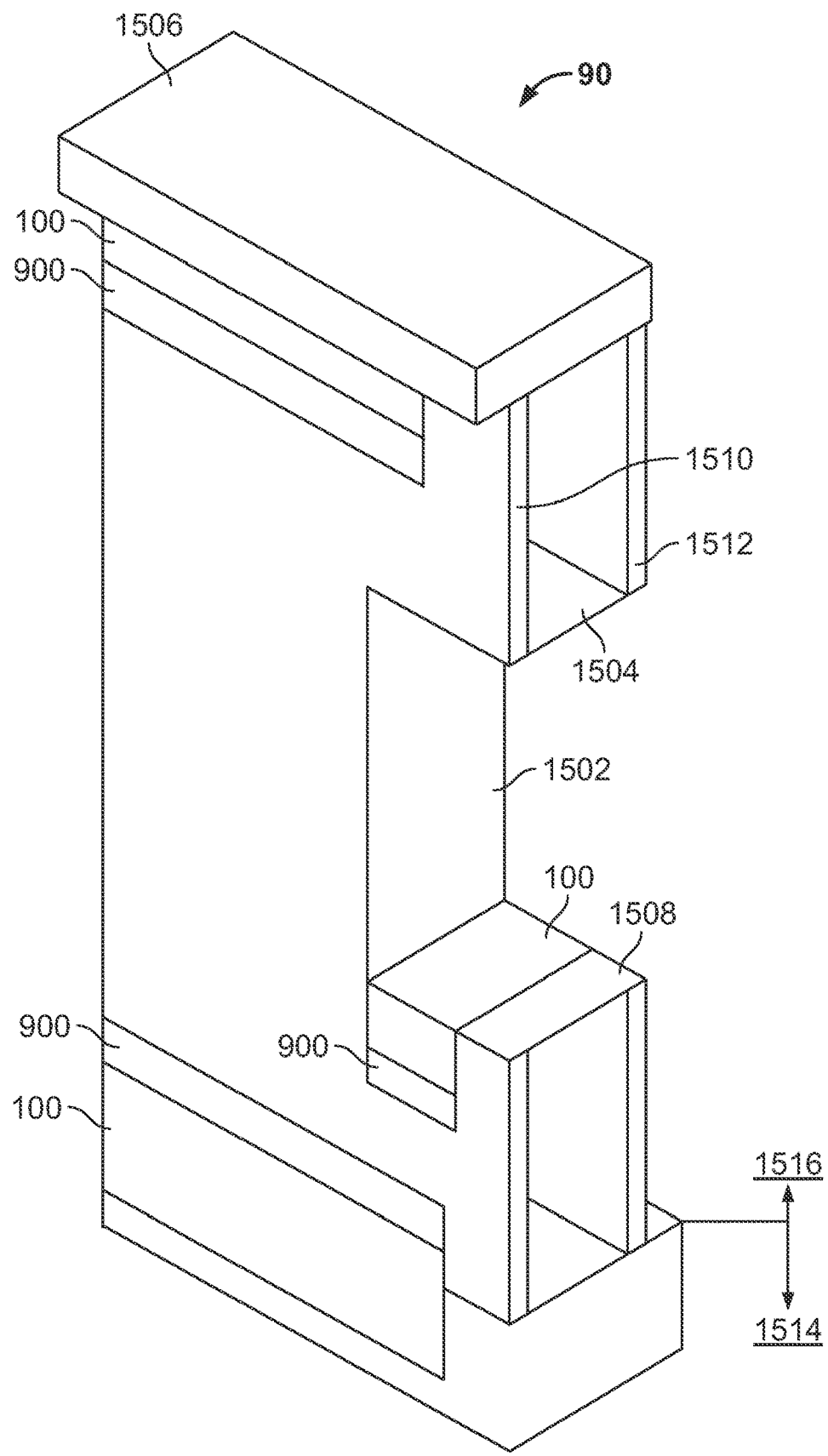
FIG. 9 is a perspective view of a flashing assembly installed a through-hole in a wall, according to some embodiments.

FIG. 9 is a perspective view of a flashing system 90, according to some embodiments. In the illustrated embodiment, a framing construction 1500 for a through-hole 1502 is shown, wherein the through-hole 1502 is configured to receive a window unit (not shown). The framing construction 1500 has a rough opening formed by the through-hole 1502 which is framed at the top by the header 1504 and top member 1506 and at the bottom by the sill 1508, both of which are supported on framing members (not shown). The framing construction 1500 further comprises an exterior sheathing 1510 and an interior wall board 1512, both of which are also attached to the framing members. At least a portion of the framing construction 1500 is below grade 1514 and at least a portion of the framing construction 1500 is above grade 1516.

As shown in FIG. 9, the flashing assembly 10 can be installed at various locations of the framing construction 1500. In some embodiments, the flashing assembly 10 is installed on the exterior sheathing 1510 underneath the top member 1506, and a membrane 1520 is applied such that the membrane 1520 covers at least a portion of the flashing assembly 10 and at least a portion of the exterior sheathing 1510. In some embodiments, the flashing assembly 10 is installed on the sill 1506 such that at least a portion of the fleece layer 400 covers the exterior sheathing 1510 and at least a portion of the flashing layer 300 covers the sill 1506, and a membrane 1540 is applied such that the membrane 1540 covers at least a portion of the flashing assembly 10 and at least a portion of the exterior sheathing 1510. In some embodiments, the flashing assembly 10 is installed below grade 1514 and above grade 1516. For example, in some embodiments, the flashing assembly 10 covers at least a portion of the exterior sheathing 1510 located above grade 1516, and a membrane 1560 covers the flashing assembly 10 and exterior sheathing 1510.

Figure 10:
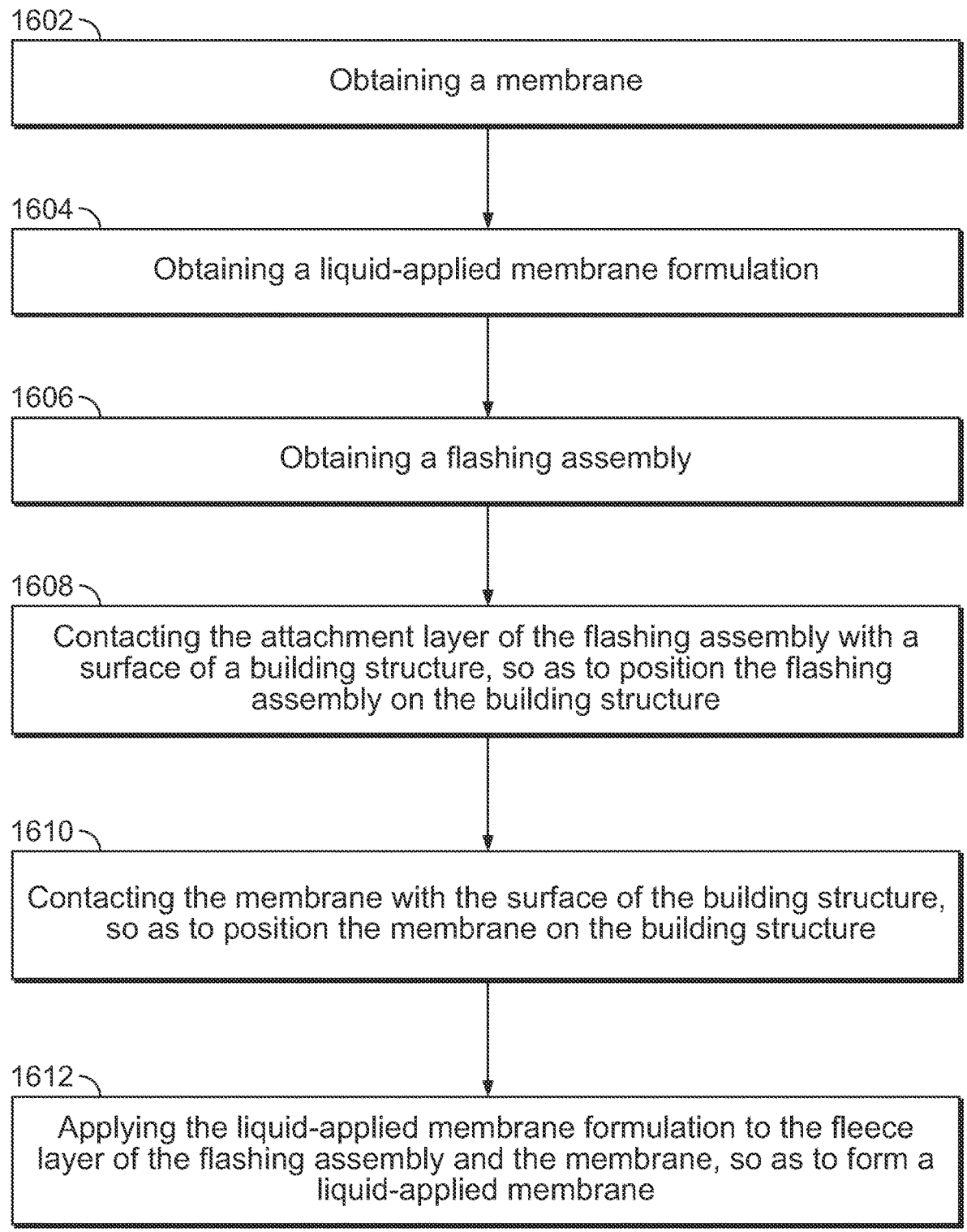
FIG. 10 is a flowchart of a method of installation, according to some embodiments.

FIG. 10 is a flowchart of a method of installation 1600, according to some embodiments. As shown in FIG. 10, in some embodiments, the method comprises one or more of the following steps: obtaining 1602 a membrane; obtaining 1604 a liquid-applied membrane formulation; obtaining 1606 a flashing assembly; contacting 1608 an attachment layer of the flashing assembly with a surface of a building structure, so as to position the flashing assembly on the building structure; contacting 1610 the membrane with the surface of the building structure, so as to position the membrane on the building structure; and applying 1612 the liquid-applied membrane formulation to a fleece layer of the flashing assembly and the membrane, so as to form a liquid-applied membrane thereon. In some embodiments, the method 1600 further comprising removing a release liner from the flashing assembly.

As used herein, the term "contacting" refers to bringing into direct contact, or close or immediate proximity. In some embodiments, for example, the contacting comprises at least one of adhering, bonding, attaching, welding, securing, fastening, or any combination thereof.

In some embodiments, the step of contacting 1608 an attachment layer of the flashing assembly with a surface of a building structure comprises contacting an attachment layer of the flashing assembly with a surface of a parapet wall, so as to position the flashing assembly on the parapet wall. In some embodiments, the step of contacting 1608 an attachment layer of the flashing assembly with a surface of a building structure comprises contacting a first portion of an attachment layer of the flashing assembly with a surface of a parapet wall, so as to position the flashing assembly on the parapet wall. In some embodiments, the step of contacting 1608 an attachment layer of the flashing assembly with a surface of a building structure comprises contacting a second portion of the attachment layer of the flashing assembly with a surface of a roof deck, so as to position the flashing assembly on the roof deck. In some embodiments, the step of contacting 1610 the membrane with the surface of the building structure comprises contacting the membrane with a surface of a roof deck, so as to position the membrane on the roof deck.

As used herein, the term "applying" refers to spraying, coating, brushing, pouring, contacting, bonding, adhering, attaching, securing, fastening, or any combination thereof.

In some embodiments, the step of applying 1612 the liquid-applied membrane formulation to a fleece layer of the flashing assembly and the membrane comprises applying the liquid-applied membrane formulation to the fleece layer of the flashing assembly and the membrane, so as to form a liquid-applied membrane thereon. In some embodiments, the step of applying 1612 the liquid-applied membrane formulation to a fleece layer of the flashing assembly and the membrane comprises applying the liquid-applied membrane formulation to the fleece layer of the flashing assembly and the roof deck, so as to form a liquid-applied membrane thereon. In some embodiments, the liquid-applied membrane is a fluid-applied coating that provides waterproofing. In some embodiments, the liquid-applied membrane comprises a polymer. In some embodiments, for example, the liquid-applied membrane comprises at least one of a silicone, an acrylic polymer, a polyurethane, a silyl-terminated polymer (e.g., silyl-terminated polyether), or any combination thereof.

Some embodiments relate to a system. In some embodiments, the system comprises a building structure. In some embodiments, the system comprises a flashing assembly. In some embodiments, the flashing assembly is located on a first portion of the building structure. In some embodiments, the flashing assembly comprises a fleece layer. In some embodiments, the flashing assembly comprises a flashing layer. In some embodiments, the flashing assembly comprises an attachment layer. In some embodiments, the flashing layer is located between the fleece layer and the attachment layer. In some embodiments, the fleece layer covers a portion of the flashing layer. In some embodiments, the attachment layer attaches the flashing assembly to the first portion of the building structure. In some embodiments, the system comprises a first membrane. In some embodiments, the first membrane is located on a second portion of the building structure. In some embodiments, the system comprises a second membrane.

In some embodiments, the second membrane is located on the fleece layer of the flashing assembly. In some embodiments, the second membrane is located on the first membrane so as to form a water-resistant seal between the first membrane and the second membrane.

In some embodiments, the flashing assembly directly contacts the first portion of the building structure.

In some embodiments, the first membrane directly contacts the second portion of the building structure.

In some embodiments, the second membrane directly contacts the fleece layer of the flashing assembly.

In some embodiments, the second membrane directly contacts the first membrane.

In some embodiments, the second membrane comprises a liquid-applied membrane.

In some embodiments, the fleece layer of the flashing assembly is embedded in the liquid-applied membrane.

In some embodiments, the fleece layer directly contacts the flashing layer and wherein the flashing layer directly contacts the attachment layer.

Some embodiments relate to a flashing assembly. In some embodiments, the flashing assembly comprises a fleece layer. In some embodiments, the flashing assembly comprises a flashing layer. In some embodiments, the flashing assembly comprises an attachment layer. In some embodiments, the flashing layer is located between the fleece layer and the attachment layer. In some embodiments, the fleece layer covers a portion of the flashing layer. In some embodiments, the attachment layer is configured to attach the flashing assembly to a building structure.

In some embodiments, the fleece layer directly contacts the flashing layer.

In some embodiments, the flashing layer directly contacts the attachment layer.

In some embodiments, the fleece layer comprises a fleece sublayer. In some embodiments, the fleece layer comprises an adhesive sublayer. In some embodiments, the adhesive sublayer is located between the fleece sublayer and the flashing layer. In some embodiments, the adhesive sublayer adheres the fleece layer to the flashing layer.

In some embodiments, the fleece layer covers 10% to 90% of the flashing layer.

In some embodiments, the flashing layer is a stainless-steel flashing layer.

In some embodiments, the attachment layer comprises a first adhesive sublayer. In some embodiments, the attachment layer comprises a polymer sublayer. In some embodiments, the attachment layer comprises a second adhesive sublayer. In some embodiments, the polymer sublayer is located between the first adhesive sublayer and the second adhesive sublayer. In some embodiments, the first adhesive sublayer adheres the attachment layer to the flashing layer. In some embodiments, the second adhesive sublayer is configured to adhere the flashing assembly to a building structure.

In some embodiments, the polymer sublayer directly contacts the first adhesive sublayer.

In some embodiments, the polymer sublayer directly contacts the second adhesive sublayer.

In some embodiments, the flashing assembly further comprises a release liner. In some embodiments, the release liner covers the second adhesive sublayer of the attachment layer of the flashing assembly.

Some embodiments relate to a method of installation. In some embodiments, the method of installation comprises obtaining a first membrane. In some embodiments, the method of installation comprises obtaining a second membrane. In some embodiments, the method of installation comprises obtaining a flashing assembly. In some embodiments, the flashing assembly comprises a fleece layer. In some embodiments, the flashing assembly comprises a flashing layer. In some embodiments, the flashing assembly comprises an attachment layer. In some embodiments, the flashing layer is located between the fleece layer and the attachment layer. In some embodiments, the fleece layer covers a portion of the flashing layer. In some embodiments, the method of installation comprises applying the attachment layer of the flashing assembly to a first portion of a building structure, so as to attach the flashing assembly to the first portion of the building structure. In some embodiments, the method of installation comprises applying the first membrane to a second portion of the building structure, so as to secure the first membrane to the second portion of the building structure. In some embodiments, the method of installation comprises applying the second membrane to the fleece layer of the flashing assembly and to the first membrane, so as to form a water-resistant seal between the first membrane and the second membrane.

In some embodiments, the second membrane is a liquid-applied membrane formulation.

Some embodiments relate to a system. In some embodiments, the system comprises a building structure. In some embodiments, the system comprises a flashing assembly. In some embodiments, the flashing assembly comprises a fleece layer; an attachment layer; and a flashing layer. In some embodiments, the flashing layer is located between the fleece layer and the attachment layer. In some embodiments, the fleece layer covers a portion of a surface of the flashing layer. In some embodiments, the attachment layer contacts the building structure. In some embodiments, the system comprises a first membrane. In some embodiments, the first membrane contacts the building structure. In some embodiments, the system comprises a second membrane. In some embodiments, the second membrane is located on the fleece layer of the flashing assembly. In some embodiments, the second membrane contacts the first membrane so as to provide a water-resistant seal between the first membrane and the second membrane.

In some embodiments, the fleece layer directly contacts the flashing layer.

In some embodiments, the fleece layer covers 10% to 90% of the surface of the flashing layer.

In some embodiments, the flashing layer is a stainless-steel flashing layer.

In some embodiments, the flashing layer directly contacts the attachment layer.

In some embodiments, the attachment layer comprises a first adhesive sublayer; a second adhesive sublayer; and a polymer sublayer. In some embodiments, the polymer sublayer is located between the first adhesive sublayer and the second adhesive sublayer. In some embodiments, the first adhesive sublayer adheres the attachment layer to the flashing layer. In some embodiments, the second adhesive sublayer adheres the flashing assembly to the building structure.

In some embodiments, the polymer sublayer directly contacts the first adhesive sublayer.

In some embodiments, the polymer sublayer directly contacts the second adhesive sublayer.

In some embodiments, the second membrane is a liquid-applied membrane.

In some embodiments, the liquid-applied membrane is embedded in the fleece layer.

Some embodiments relate to a method of installation. In some embodiments, the method of installation comprises obtaining a membrane. In some embodiments, the method of installation comprises obtaining a liquid-applied membrane formulation. In some embodiments, the method of installation comprises obtaining a flashing assembly. In some embodiments, the flashing assembly comprises a fleece layer; an attachment layer; and a flashing layer. In some embodiments, the flashing layer is located between the fleece layer and the attachment layer. In some embodiments, the fleece layer covers a portion of a surface of the flashing layer. In some embodiments, the method of installation comprises contacting the attachment layer of the flashing assembly with a surface of a building structure, so as to position the flashing assembly on the building structure. In some embodiments, the method of installation comprises contacting the membrane with the surface of the building structure, so as to position the membrane on the building structure. In some embodiments, the method of installation comprises applying the liquid-applied membrane formulation to the fleece layer of the flashing assembly and the membrane, so as to form a liquid-applied membrane.

In some embodiments, the fleece layer directly contacts the flashing layer.

In some embodiments, the fleece layer covers 10% to 90% of the surface of the flashing layer.

In some embodiments, the flashing layer is a stainless-steel flashing layer.

In some embodiments, the flashing layer directly contacts the attachment layer.

In some embodiments, the attachment layer comprises a first adhesive sublayer; a second adhesive sublayer; and a polymer sublayer. In some embodiments, the polymer sublayer is located between the first adhesive sublayer and the second adhesive sublayer. In some embodiments, the first adhesive sublayer adheres the attachment layer to the flashing layer. In some embodiments, the second adhesive sublayer adheres the flashing assembly to the building structure.

In some embodiments, the polymer sublayer directly contacts the first adhesive sublayer.

In some embodiments, the polymer sublayer directly contacts the second adhesive sublayer.

Some embodiments relate to a flashing assembly. In some embodiments, the flashing assembly comprises a fleece layer; an attachment layer; and a flashing layer. In some embodiments, the flashing layer is located between the fleece layer and the attachment layer. In some embodiments, the fleece layer covers a portion of a surface of the flashing layer. In some embodiments, the attachment layer comprises a first adhesive sublayer; a second adhesive sublayer; and a polymer sublayer. In some embodiments, the polymer sublayer is located between the first adhesive sublayer and the second adhesive sublayer. In some embodiments, the first adhesive sublayer adheres the attachment layer to the flashing layer.

In some embodiments, the flashing assembly further comprises a release liner, wherein the second adhesive sublayer adheres the release liner to the flashing assembly.

Some embodiments relate to a flashing assembly. In some embodiments, the flashing assembly comprises a fleece layer; an attachment layer; and a flashing layer. In some embodiments, the flashing layer is located between the fleece layer and the attachment layer. In some embodiments, the fleece layer covers a portion of a surface of the flashing layer. In some embodiments, the attachment layer comprises a first adhesive sublayer; a second adhesive sublayer; a polymer sublayer; and a release liner. In some embodiments, the polymer sublayer is located between the first adhesive sublayer and the second adhesive sublayer. In some embodiments, the first adhesive sublayer adheres the attachment layer to the flashing layer. In some embodiments, the second adhesive sublayer adheres the release liner to the flashing assembly.

Some embodiments relate to a system. In some embodiments, the system comprises a building structure. In some embodiments, the building structure comprises a roof deck; and a parapet wall extending from the roof deck. In some embodiments, the parapet wall has a first side and a second side opposite the first side. In some embodiments, the first side faces the roof deck. In some embodiments, the second side faces away from the roof deck. In some embodiments, the system comprises a flashing assembly. In some embodiments, the flashing assembly comprises a fleece layer; an attachment layer; and a flashing layer. In some embodiments, the flashing layer is located between the fleece layer and the attachment layer. In some embodiments, the fleece layer covers a portion of a surface of the flashing layer. In some embodiments, the fleece layer is located on the first side of the parapet wall. In some embodiments, the attachment layer contacts the parapet wall. In some embodiments, the system comprises a first membrane. In some embodiments, the first membrane is located on the roof deck. In some embodiments, the system comprises a second membrane. In some embodiments, the second membrane is located on the fleece layer. In some embodiments, the second membrane contacts the first membrane, so as to form a water-resistant seal therebetween.

Some embodiments relate to a system. In some embodiments, the system comprises a building structure. In some embodiments, the building structure comprises a roof deck; and a parapet wall extending from the roof deck. In some embodiments, the parapet wall has a first side and a second side opposite the first side. In some embodiments, the first side faces the roof deck. In some embodiments, the second side faces away from the roof deck. In some embodiments, the system comprises a first flashing assembly. In some embodiments, the first flashing assembly comprises a first fleece layer; a first attachment layer; and a first flashing layer. In some embodiments, the first flashing layer is located between the first fleece layer and the first attachment layer. In some embodiments, the first fleece layer covers a portion of a surface of the first flashing layer. In some embodiments, the first fleece layer is located on the first side of the parapet wall. In some embodiments, the first attachment layer contacts the parapet wall. In some embodiments, the system comprises a second flashing assembly. In some embodiments, the second flashing assembly comprises a second fleece layer; a second attachment layer; and a second flashing layer. In some embodiments, the second flashing layer is located between the second fleece layer and the second attachment layer. In some embodiments, the second fleece layer covers a portion of a surface of the second flashing layer. In some embodiments, the second fleece layer is located on the second side of the parapet wall. In some embodiments, the second attachment layer has a first portion and a second portion. In some embodiments, the first portion of the second attachment layer contacts the first flashing layer of the first flashing assembly. In some embodiments, the second portion of the second attachment layer contacts the second side of the parapet wall. In some embodiments, the system comprises a first membrane. In some embodiments, the first membrane is located on the roof deck. In some embodiments, the system comprises a second membrane. In some embodiments, the second membrane is located on the first fleece layer. In some embodiments, the second membrane contacts the first membrane, so as to form a water-resistant seal therebetween. In some embodiments, the system comprises a third membrane. In some embodiments, the third membrane is located on the second fleece layer and the second side of the parapet wall.

Some embodiments relate to a system. In some embodiments, the system comprises a building structure. In some embodiments, the building structure comprises a roof deck; and a parapet wall extending from the roof deck. In some embodiments, the parapet wall has a first side and a second side opposite the first side. In some embodiments, the first side faces the roof deck. In some embodiments, the second side faces away from the roof deck. In some embodiments, the system comprises a flashing assembly. In some embodiments, the flashing assembly comprises a fleece layer; an attachment layer; and a flashing layer. In some embodiments, the flashing layer is located between the fleece layer and the attachment layer. In some embodiments, the fleece layer covers a portion of a surface of the flashing layer. In some embodiments, the fleece layer is located on the second side of the parapet wall. In some embodiments, the attachment layer contacts the parapet wall. In some embodiments, the system comprises a membrane. In some embodiments, the membrane is located on the fleece layer and the second side of the parapet wall.

Some embodiments relate to a system. In some embodiments, the system comprises a building structure. In some embodiments, the building structure comprises a roof deck; and a parapet wall extending from the roof deck. In some embodiments, the parapet wall has a first side and a second side opposite the first side. In some embodiments, the first side faces the roof deck. In some embodiments, the second side faces away from the roof deck. In some embodiments, the system comprises a flashing assembly. In some embodiments, the flashing assembly comprises a fleece layer; an attachment layer; and a flashing layer. In some embodiments, the flashing layer is located between the fleece layer and the attachment layer. In some embodiments, the fleece layer covers a portion of a surface of the flashing layer. In some embodiments, the fleece layer is located on the first side of the parapet wall. In some embodiments, the attachment layer has a first portion and a second portion. In some embodiments, the first portion of the attachment layer contacts the first side of the parapet wall. In some embodiments, the second portion of the attachment layer contacts the roof deck. In some embodiments, the system comprises a membrane. In some embodiments, the membrane is located on the fleece layer and the roof deck.

Some embodiments relate to a system. In some embodiments, the system comprises a building structure. In some embodiments, the building structure comprises a roof deck; and a building wall extending downwards from the roof deck. In some embodiments, the system comprises a flashing assembly. In some embodiments, the flashing assembly comprises a fleece layer; an attachment layer; and a flashing layer. In some embodiments, the flashing layer is located between the fleece layer and the attachment layer. In some embodiments, the fleece layer covers a portion of a surface of the flashing layer. In some embodiments, the attachment layer has a first portion and a second portion. In some embodiments, the first portion of the attachment layer contacts the roof deck. In some embodiments, the second portion of the attachment layer contacts the building wall. In some embodiments, the system comprises a membrane. In some embodiments, the membrane is located on the fleece layer and the building wall.

Some embodiments relate to a system. In some embodiments, the system comprises a building structure. In some embodiments, the building structure comprises a roof deck; and a skylight structure extending from the roof deck. In some embodiments, the system comprises a flashing assembly. In some embodiments, the flashing assembly comprises a fleece layer; an attachment layer; and a flashing layer. In some embodiments, the flashing layer is located between the fleece layer and the attachment layer. In some embodiments, the fleece layer covers a portion of a surface of the flashing layer. In some embodiments, the attachment layer contacts the skylight structure. In some embodiments, the system comprises a membrane. In some embodiments, the membrane covers the fleece layer and the skylight structure.

Some embodiments relate to a method of installation. In some embodiments, the method of installation comprises obtaining a membrane. In some embodiments, the method of installation comprises obtaining a liquid-applied membrane formulation. In some embodiments, the method of installation comprises obtaining a flashing assembly. In some embodiments, the flashing assembly comprises a fleece layer; an attachment layer; and a flashing layer. In some embodiments, the flashing layer is located between the fleece layer and the attachment layer. In some embodiments, the fleece layer covers a portion of a surface of the flashing layer. In some embodiments, the method of installation comprises contacting the attachment layer of the flashing assembly with a surface of a parapet wall, so as to position the flashing assembly on the parapet wall. In some embodiments, the method of installation comprises contacting the membrane with a surface of a roof deck, so as to position the membrane on the roof deck. In some embodiments, the method of installation comprises applying the liquid-applied membrane formulation to the fleece layer of the flashing assembly and the membrane, so as to form a liquid-applied membrane thereon.

Some embodiments relate to a method of installation. In some embodiments, the method of installation comprises obtaining a membrane. In some embodiments, the method of installation comprises obtaining a liquid-applied membrane formulation. In some embodiments, the method of installation comprises obtaining a flashing assembly. In some embodiments, the flashing assembly comprises a fleece layer; an attachment layer; and a flashing layer. In some embodiments, the flashing layer is located between the fleece layer and the attachment layer. In some embodiments, the fleece layer covers a portion of a surface of the flashing layer. In some embodiments, the attachment layer has a first portion and a second portion. In some embodiments, the method of installation comprises contacting the first portion of the attachment layer of the flashing assembly with a surface of a parapet wall, so as to position the flashing assembly on the parapet wall. In some embodiments, the method of installation comprises contacting the second portion of the attachment layer of the flashing assembly with a surface of a roof deck, so as to position the flashing assembly on the roof deck. In some embodiments, the method of installation comprises applying the liquid-applied membrane formulation to the fleece layer of the flashing assembly and the roof deck, so as to form a liquid-applied membrane thereon.

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

Any prior patents and publications referenced herein are incorporated by reference in their entireties.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A system comprising:
a building structure;
a flashing assembly,
wherein the flashing assembly is located on a first portion of the building structure;
wherein the flashing assembly comprises:
a fleece layer;
a flashing layer; and
an attachment layer;
wherein the flashing layer is located between the fleece layer and the attachment layer;
wherein the fleece layer covers a portion of the flashing layer;
wherein the attachment layer attaches the flashing assembly to the first portion of the building structure;
a first membrane,
wherein the first membrane is located on a second portion of the building structure; and
a second membrane,
wherein the second membrane is located on the fleece layer of the flashing assembly;
wherein the fleece layer of the flashing assembly is embedded in the second membrane;
wherein the second membrane is located on the first membrane so as to form a water-resistant seal between the first membrane and the second membrane.

2. The system of claim 1, wherein the flashing assembly directly contacts the first portion of the building structure.

3. The system of claim 1, wherein the first membrane directly contacts the second portion of the building structure.

4. The system of claim 1, wherein the second membrane directly contacts the fleece layer of the flashing assembly.

5. The system of claim 1, wherein the second membrane directly contacts the first membrane.

6. The system of claim 1, wherein the second membrane comprises a liquid-applied membrane.

7. The system of claim 1, wherein the fleece layer directly contacts the flashing layer and wherein the flashing layer directly contacts the attachment layer.

8. A method of installation comprising:
obtaining a first membrane;
obtaining a second membrane;
obtaining a flashing assembly,
wherein the flashing assembly comprises:
a fleece layer;
a flashing layer; and
an attachment layer;
wherein the flashing layer is located between the fleece layer and the attachment layer;
wherein the fleece layer covers a portion of the flashing layer;
applying the attachment layer of the flashing assembly to a first portion of a building structure, so as to attach the flashing assembly to the first portion of the building structure;
applying the first membrane to a second portion of the building structure, so as to secure the first membrane to the second portion of the building structure; and
applying the second membrane;
to the fleece layer of the flashing assembly, such that the fleece layer of the flashing assembly is embedded in the second membrane; and
to the first membrane, so as to form a water-resistant seal between the first membrane and the second membrane.

9. The method of claim 8, wherein the second membrane is a liquid-applied membrane formulation.

10. The method of claim 8, wherein applying the attachment layer of the flashing assembly comprises adhering the attachment layer of the flashing assembly to the first portion of the building structure.

11. The method of claim 8, wherein applying the first membrane comprises applying a first liquid-applied membrane formulation to the second portion of the building structure.

12. The method of claim 8, wherein applying the second membrane comprises applying a liquid-applied membrane formulation to the fleece layer of the flashing assembly and to the first membrane.

13. The method of claim 8, wherein the flashing assembly directly contacts the first portion of the building structure.

14. The method of claim 8, wherein the first membrane directly contacts the second portion of the building structure.

15. The method of claim 8, wherein the second membrane directly contacts the fleece layer of the flashing assembly.

16. The method of claim 8, wherein the second membrane directly contacts the first membrane.

17. The method of claim 8, wherein the fleece layer directly contacts the flashing layer.

18. The method of claim 8, wherein the flashing layer directly contacts the attachment layer.

19. The system of claim 1, wherein the fleece layer directly contacts the flashing layer.

20. The system of claim 1, wherein the flashing layer directly contacts the attachment layer.

* * * * *